(12) United States Patent
Kaplan et al.

(10) Patent No.: US 11,070,465 B2
(45) Date of Patent: Jul. 20, 2021

(54) DISTRIBUTION OF MULTICAST INFORMATION IN A ROUTING SYSTEM

(71) Applicant: 128 Technology, Inc., Burlington, MA (US)

(72) Inventors: Hadriel S. Kaplan, Nashua, NH (US); Abilash Menon, Boxborough, MA (US); Patrick Timmons, Newton, MA (US); Michael Baj, Somerville, MA (US); Robert Penfield, Concord, MA (US); Patrick McLampy, Dunstable, MA (US)

(73) Assignee: 128 Technology, Inc., Burlington, MA (US)

( * ) Notice: Subject to any disclaimer, the term of this patent is extended or adjusted under 35 U.S.C. 154(b) by 0 days.

(21) Appl. No.: 16/410,128

(22) Filed: May 13, 2019

(65) Prior Publication Data

US 2020/0366594 A1 Nov. 19, 2020

(51) Int. Cl.
| | |
|---|---|
| *H04L 12/761* | (2013.01) |
| *H04L 12/721* | (2013.01) |
| *H04L 12/723* | (2013.01) |
| *H04L 29/06* | (2006.01) |
| *H04L 12/751* | (2013.01) |

(52) U.S. Cl.
CPC ............. *H04L 45/16* (2013.01); *H04L 45/02* (2013.01); *H04L 45/34* (2013.01); *H04L 45/50* (2013.01); *H04L 63/10* (2013.01)

(58) Field of Classification Search
None
See application file for complete search history.

(56) References Cited

U.S. PATENT DOCUMENTS

| | | |
|---|---|---|
| 6,108,710 A | 8/2000 | Brabson et al. |
| 6,507,577 B1 | 1/2003 | Mauger et al. |
| 6,563,835 B1 | 5/2003 | Chen |
| 6,587,438 B1 | 7/2003 | Brendel |
| 6,982,966 B2 | 1/2006 | Eidenschink et al. |
| 9,762,485 B2 | 9/2017 | Kaplan et al. |
| 9,985,883 B2 | 5/2018 | MeLampy et al. |
| 10,432,522 B2 | 10/2019 | Kaplan et al. |
| 2005/0114656 A1 | 5/2005 | Liu et al. |
| 2006/0062214 A1 | 3/2006 | Ng et al. |

(Continued)

FOREIGN PATENT DOCUMENTS

| | | |
|---|---|---|
| EP | 1185041 A2 | 3/2002 |
| EP | 1741247 B1 | 4/2012 |

OTHER PUBLICATIONS

U.S. Appl. No. 16/410,100, filed May 13, 2019, Service and Topology Exchange Protocol.

(Continued)

*Primary Examiner* — Jason E Mattis
*Assistant Examiner* — Hong Shao
(74) *Attorney, Agent, or Firm* — Shumaker & Sieffert, P.A.

(57) ABSTRACT

A routing system for distributing multicast routing information for a multicast service includes a plurality of routers including a multicast source router and a plurality of multicast receiver routers, the plurality of routers providing a multicast service, wherein the routers are configured to exchange multicast information associated with the multicast service including identification of multicast sources and the multicast receivers.

26 Claims, 15 Drawing Sheets

START

The source router determines a path for a route or service including an ordered list of successive routers to receive a packet associated with the route or service starting with a first successive router and ending with a destination router (2102)

The source router transmits the packet toward the first successive router with a metadata field including a list of at least one remaining router of the ordered list of routers to receive the packet associated with the route or service (2104)

Each successive router, starting with the first successive router, determines if the router is the destination router and forwards the packet toward a next successive router in the ordered list of routers if the router is not the destination router (2106)

(56) References Cited

U.S. PATENT DOCUMENTS

| | | |
|---|---|---|
| 2007/0008949 A1 | 1/2007 | Balandin |
| 2007/0058638 A1 | 3/2007 | Guichard et al. |
| 2007/0177511 A1 | 8/2007 | Das et al. |
| 2008/0062891 A1 | 3/2008 | Van der Merwe et al. |
| 2008/0170570 A1 | 7/2008 | Moskaluk et al. |
| 2009/0097418 A1 | 4/2009 | Castillo et al. |
| 2009/0116404 A1 | 5/2009 | Mahop et al. |
| 2010/0043067 A1* | 2/2010 | Varadhan ............... H04L 45/16 726/13 |
| 2011/0032844 A1 | 2/2011 | Patel et al. |
| 2012/0069740 A1 | 3/2012 | Lu et al. |
| 2012/0281520 A1 | 11/2012 | Ansari et al. |
| 2013/0089093 A1 | 4/2013 | Bacthu et al. |
| 2013/0219035 A1 | 8/2013 | Detienne et al. |
| 2014/0010117 A1 | 1/2014 | Lindem, III et al. |
| 2014/0129735 A1 | 5/2014 | Thyni et al. |
| 2014/0355415 A1 | 12/2014 | Mandal et al. |
| 2015/0381515 A1 | 12/2015 | Mattson et al. |
| 2016/0321341 A1 | 11/2016 | Ramamurthi |
| 2016/0352631 A1 | 12/2016 | Medved et al. |
| 2017/0250906 A1 | 8/2017 | MeLampy et al. |
| 2017/0331694 A1 | 11/2017 | Crickett et al. |
| 2017/0346691 A1 | 11/2017 | Crickett et al. |
| 2018/0041555 A1* | 2/2018 | Manohar ............ H04L 12/4641 |
| 2018/0062932 A1 | 3/2018 | Cohn et al. |
| 2018/0102965 A1 | 4/2018 | Hari et al. |
| 2018/0314706 A1 | 11/2018 | Sirton et al. |
| 2019/0028577 A1 | 1/2019 | D'Souza et al. |
| 2019/0104206 A1 | 4/2019 | Goel et al. |
| 2019/0109770 A1 | 4/2019 | Pugaczewski |
| 2019/0116053 A1* | 4/2019 | Allan ..................... H04L 12/18 |
| 2020/0106640 A1 | 4/2020 | Labonte et al. |
| 2020/0366593 A1 | 11/2020 | Kaplan et al. |

OTHER PUBLICATIONS

U.S. Appl. No. 16/410,121, filed May 13, 2019, Routing Using Segment-Based Metrics.
U.S. Appl. No. 16/410,122, filed May 13, 2019, Central Authority for Service and Topology Exchange.
U.S. Appl. No. 16/410,124, filed May 13, 2019, Multicast Source and Receiver Access Control.
U.S. Appl. No. 16/410,131, filed May 13, 2019, Source-Based Routing.
[No Author] 128 Technology, Step Solution Note, 9 pages (Aug. 2017).
[No Author] 128 Technology, Network Security with 128 Networking Platform Whitepaper, 12 pages (Sep. 2019).
[No Author] Enhanced Interior Gateway Routing Protocol (EIGRP) Wide Metrics Whitepaper, Cisco, 14 pages (Feb. 2016).
[No Author] 128 Technology, Hypersegmentation Under the Flood Whitepaper, 9 pages (Aug. 2018).
[No Author] 128 Technology, Application Classification Solution Note, 11 pages (Aug. 2017).
[No Author] 128 Technology, Failsafe Delivery Whitepaper, 13 pages (Sep. 2017).
[No Author] 128 Technology, Multipoint Secure Vector Routing Whitepaper, 9 pages (Jun. 2017).
[No Author] 128 Technology, Quality of Service Whitepaper, 6 pages (Oct. 2019).
[No Author] 128 Technology, Resiliency Whitepaper, 9 pages (Sep. 2017).
[No Author] 128 Technology, "Session Smart RoutingTM: How it Works," Technical Whitepaper, 15 pages (Mar. 2018).
Atlas A., et al., "Performance Based Path Selection for Explicitly Routed Label Switched Paths (LSPs) Using TE Metric Extensions," 10 pages (May 2016).
Caria M., et al., "SDN Partitioning: A Centralized Control Plane for Distributed Routing Protocols," Preliminary Version / Preprint, 14 pages (Apr. 2016).
Cordero J.A., "Link-State Routing Optimization for Compound Autonomous Systems in the Internet," 77 pages (2011).
Crawley E., et al., "A Framework for QoS-based Routing in the Internet," 37 pages (Aug. 1998).
Ferro, G. and Brockners, F.; Cisco; Response: Distributed? Centralized? Both?—Cisco Blog on OnePK and SDN Blog Post; Jul. 29, 2012.
Filsfils C., "Segmant Routing Architecture," Internet Engineering Task Force (IETF), 32 pages (Jul. 2018).
George W., et al., Time Warner Cable et al., "Autonomous System Migration Mechanisms and Their Effects on the BGP AS_PATH Attribute," 16 pages (Nov. 2015).
IP Performance Measurement (ippm) documents, 15 pages [retrieved from: https://datatracker.ietf.org/wg/ippm/documents/] (Jun. 2020).
Rekhter Y., et al., Chrysler Corp., et al., "Address Allocation for Private Internets," 9 pages (Feb. 1996).
Vissicchio S., et al., "Central Control over Distributed Routing," 14 pages (Aug. 2015).
Wijnands I.J., et al., Cisco Systems, et al., "PIM Flooding Mechanism (PFM) and Source Discovery (SD)," 18 pages (Mar. 2018).
Younis O., et al., "Constraint-Based Routing in the Internet: Basic Principles and Recent Research," IEEE Communications Surveys and Tutorials, vol. 5, Issue No. 1, Third Quarter, 15 pages (2003).
Sollins et al., "Functional Requirements for Uniform Resource Names," Network Working Group; RFC 1737, Dec. 1994, 7 pp.
Berners-Lee et al., "Uniform Resource Identifier (URI): Generic Syntax," Network Working Group; RFC 3986, Jan. 2005, 62 pp.
Bryan et al., "JavaScript Object Notation {JSON} Patch," Internet Engineering Task Force (IETF); RFC 6902, Apr. 2013, 19 pp.
Office Action from U.S. Appl. No. 16/410,124, dated Sep. 3, 2020, 11 pp.
Response to Office Action dated Sep. 3, 2020, from U.S. Appl. No. 16/410,124, filed Nov. 16, 2020, 10 pp.
International Search Report and Written Opinion for Application No. PCT/US2020/032504, dated Aug. 31, 2020 (12 pages).
Notice of Allowance from U.S. Appl. No. 16/410,124, dated Feb. 18, 2021, 7 pp.
Supplemental Notice of Allowability from U.S. Appl. No. 16/410,124, dated Apr. 9, 2021, 2 pp.
U.S. Appl. No. 17/314,268, filed May 7, 2021, naming inventors Kaplan et al.

* cited by examiner

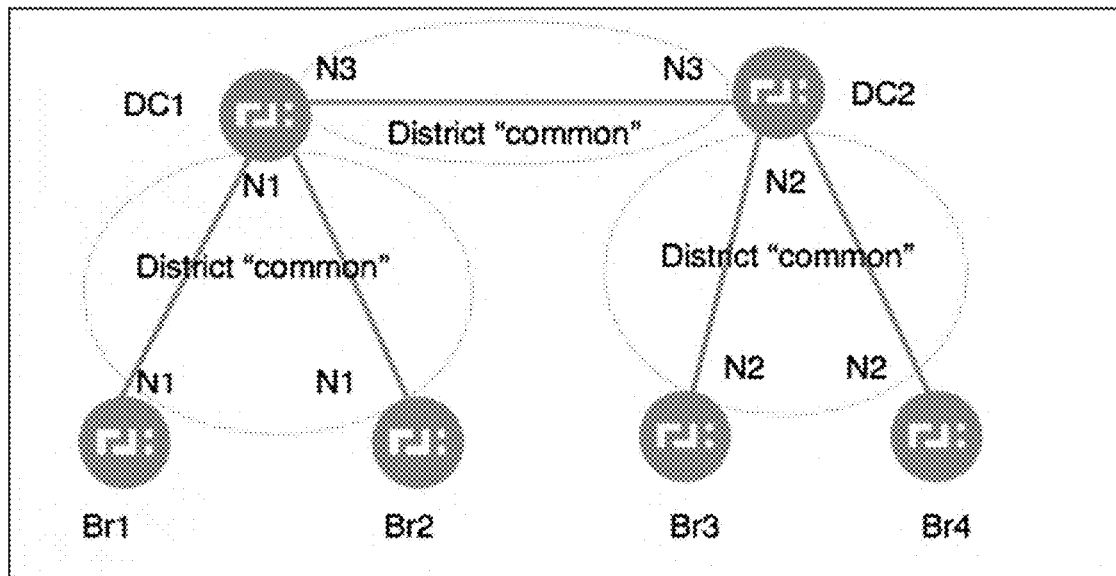
FIG. 5: One district across all routers
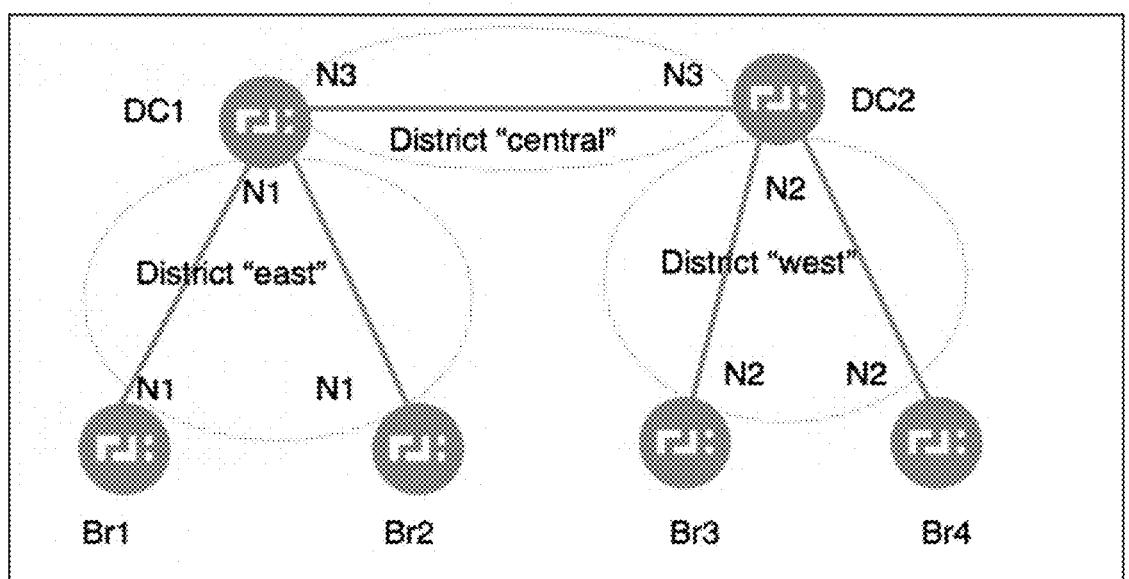
FIG. 6: Multiple districts across the network

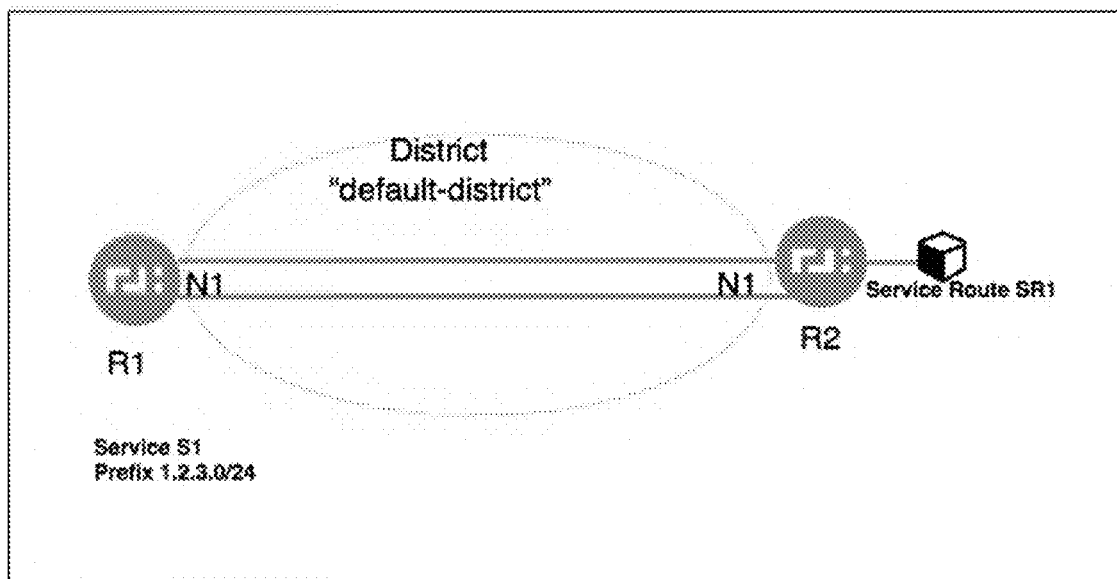
FIG. 7: Service exchange between routers
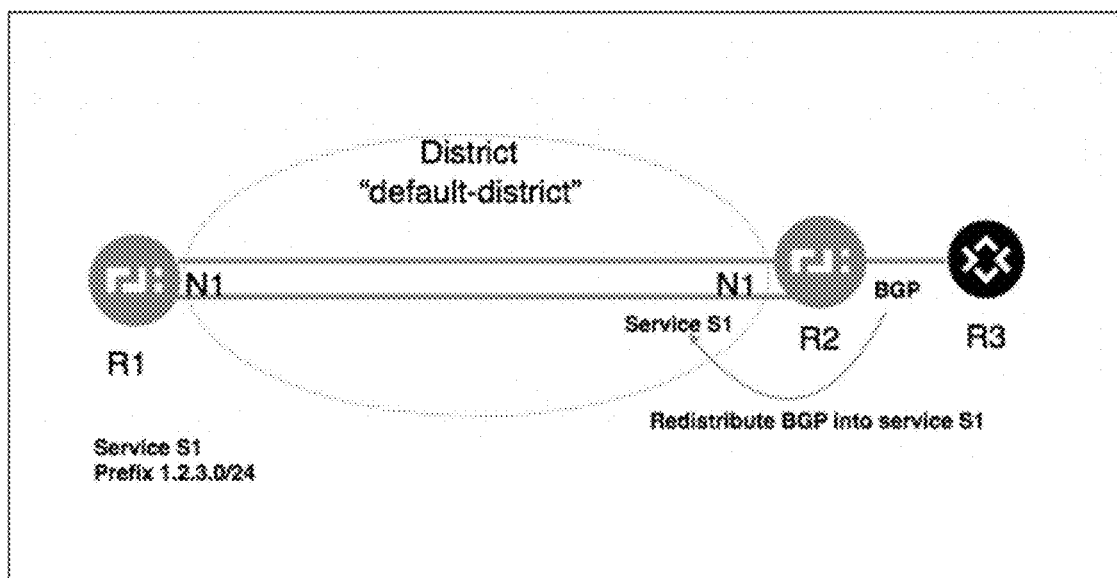
FIG. 8: Redistribute BGP into services

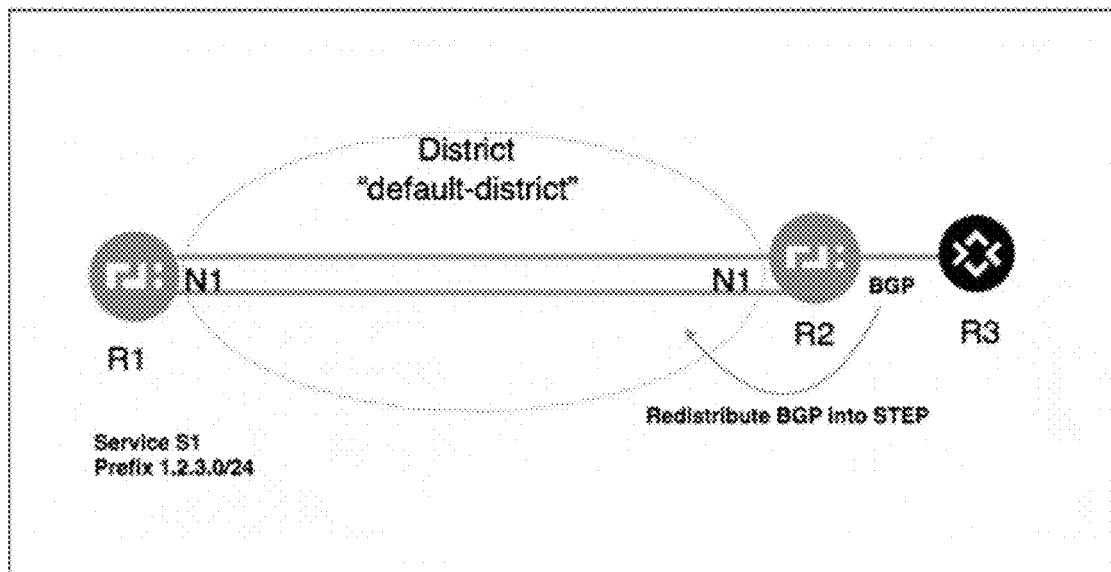
FIG. 9: Redistribute routes learned from BGP into STEP
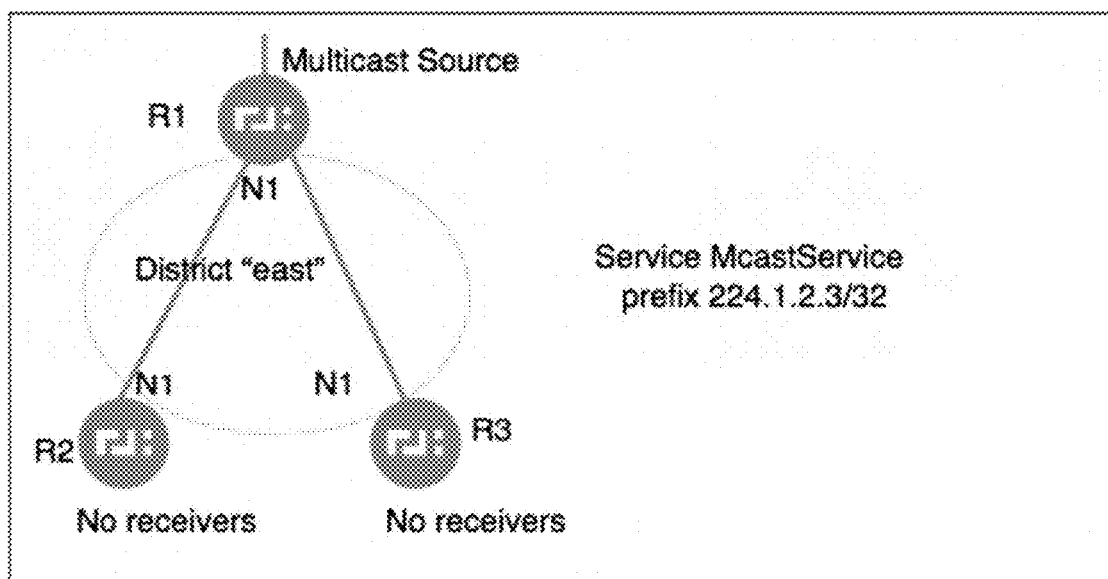
FIG. 10: Multicast with no receivers

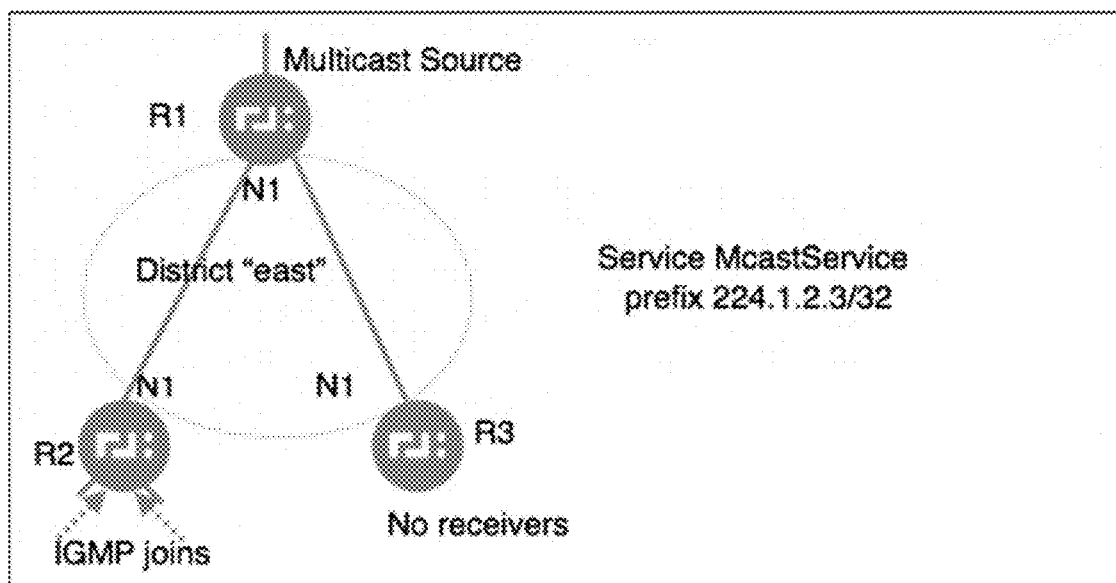
FIG. 11: Multicast with receivers on R2
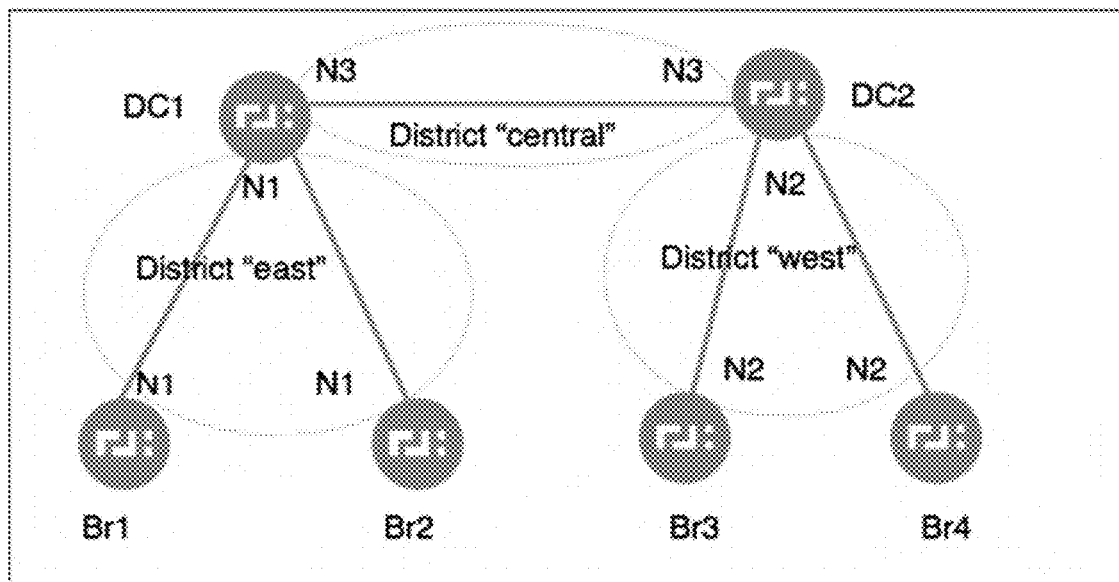
FIG. 12: Service exchange between districts

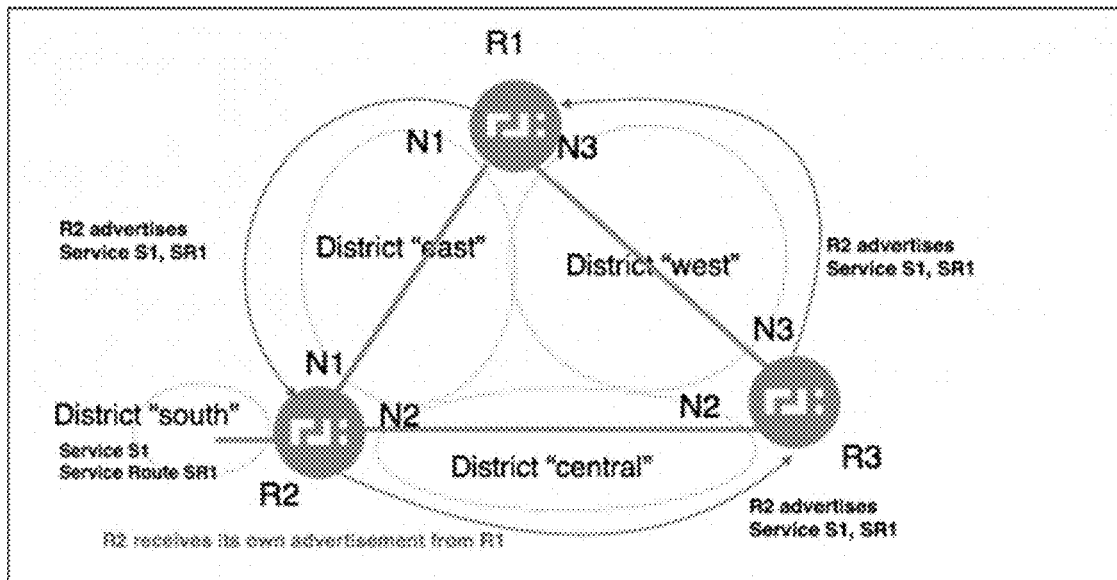
FIG. 13: Service exchange between districts causing a loop
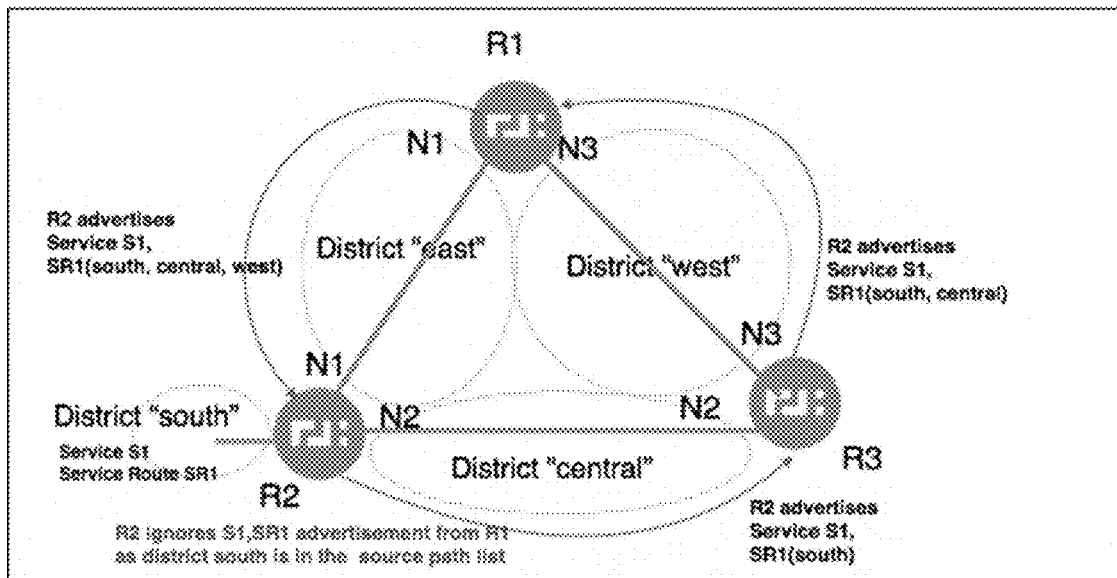
FIG. 14: Service exchange between districts with loop avoidance

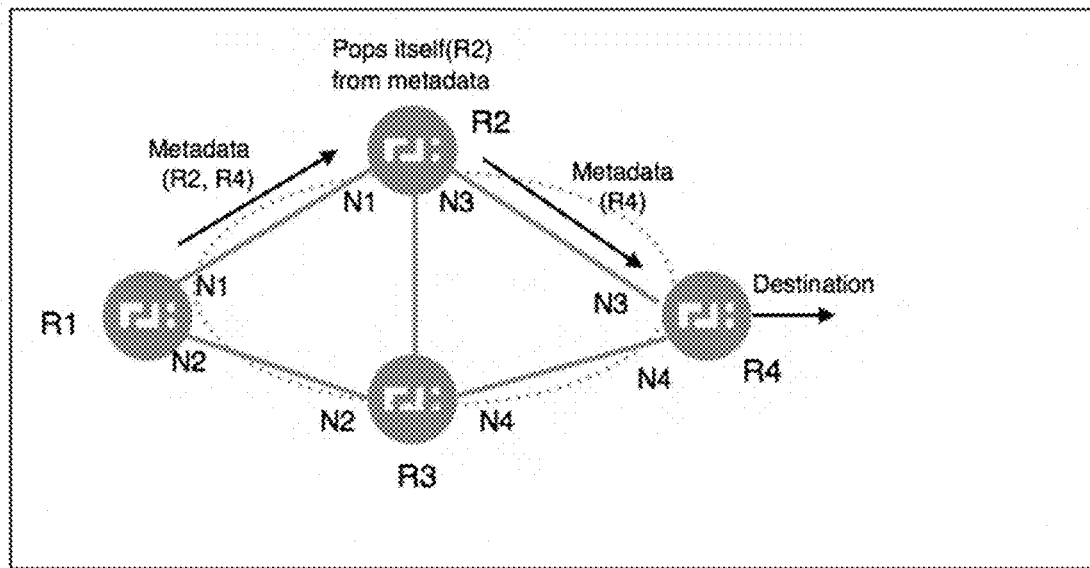
FIG. 15: Source based routing within same district
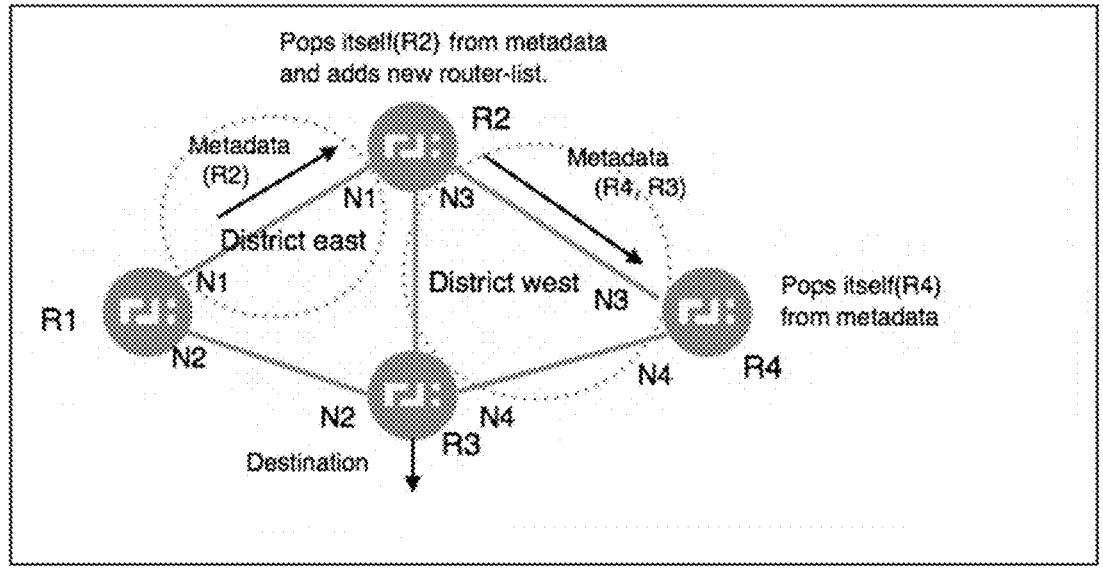
FIG. 16: Source based routing across districts

START

↓

The source router determines a path for a route or service including an ordered list of successive routers to receive a packet associated with the route or service starting with a first successive router and ending with a destination router (2102)

↓

The source router transmits the packet toward the first successive router with a metadata field including a list of at least one remaining router of the ordered list of routers to receive the packet associated with the route or service (2104)

↓

Each successive router, starting with the first successive router, determines if the router is the destination router and forwards the packet toward a next successive router in the ordered list of routers if the router is not the destination router (2106)

FIG. 20

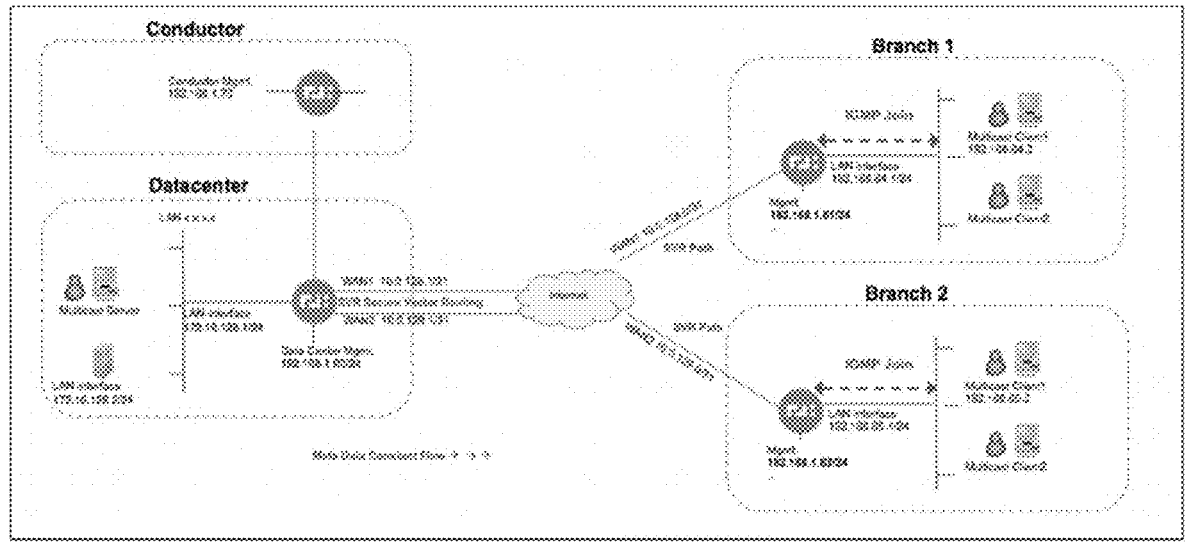
FIG. 21: Point to Multipoint SVR
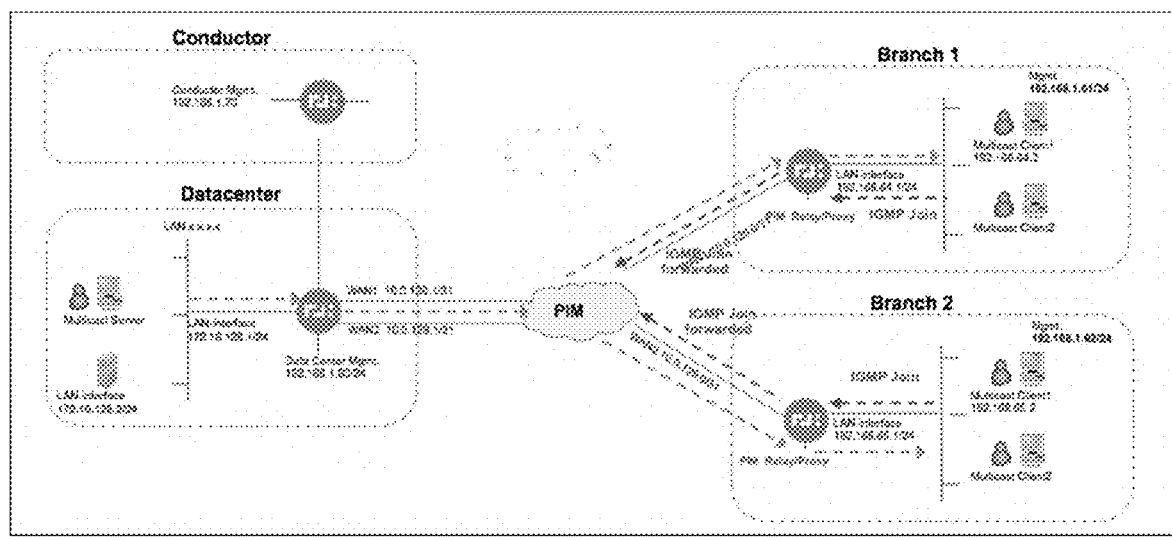
FIG. 22: Multicast Proxy

DISTRIBUTION OF MULTICAST INFORMATION IN A ROUTING SYSTEM

CROSS-REFERENCE TO RELATED APPLICATION(S)

This patent application is related to U.S. patent application Ser. No. 15/054,781 filed Feb. 26, 2016 (now issued U.S. Pat. No. 9,985,883), entitled, "NAME-BASED ROUTING SYSTEM AND METHOD,", and naming MeLampy, Baj, Kumar, Penfield, and Timmons as inventors, the disclosure of which is incorporated herein, in its entirety, by reference.

This patent application also is related to U.S. patent application Ser. No. 14/833,571, filed Aug. 24, 2015 (now issued U.S. Pat. No. 9,762,485), entitled, "Network Packet Flow Controller with Extended Session Management,", and naming Kaplan, Kumar, Timmons, and MeLampy as inventors, the disclosure of which is incorporated herein, in its entirety, by reference.

FIELD OF THE INVENTION

The invention generally relates to distribution of multicast information in a routing system.

BACKGROUND OF THE INVENTION

A routing platform such as the 128T routing platform from 128 Technology of Burlington, Mass. can be considered service-oriented, in that the service configuration is the focal point of the data model (and hence the configuration paradigm). In such service-oriented routing platforms, administrators may define services to represent the capabilities that their network is designed to deliver to consumers, and these services—along with their requisite policies and characteristics—dictate how the traffic patterns traverse the network.

The 128T routing platform is comprised of two primary components: the Session Smart Router (SSR) and the Conductor. Together, the SSR and Conductor form a single logical control plane that is highly distributed, and a data plane that is truly session-aware. The SSR combines a service-centric control plane and a session-aware data plane to offer all IP routing tables, feature-rich policy management, advanced data collection, and analytics in addition to high-speed packet forwarding, classification, and security functions. The Conductor is a centralized management and policy engine that provides orchestration, administration, zero-touch provisioning, monitoring, and analytics for distributed SSRs—while maintaining a network-wide, multi-tenant service, and policy data model. Through these components, the 128T routing platform supports a wide range of deployment models scaling from a small branch office to a high capacity edge router to a hyper-scale software-defined data center.

To date, the notion of services has been limited to a single "router" (collection of nodes), or exported to external routers using explicit configuration, through the use of the Conductor. This can make it difficult to extend service configuration to a large number of SSRs.

SUMMARY OF VARIOUS EMBODIMENTS

In accordance with one embodiment of the invention, a routing system for providing multicast access control comprises a plurality of routers including a multicast source router and a plurality of multicast receiver routers, the plurality of routers providing a multicast service, wherein the routers are configured to enforce multicast access control policies for the multicast service including a receiver access policy that controls which multicast receivers are allowed to receive packets from the multicast service and a sender access policy that controls which multicast sources are allowed to send packets to the multicast service for distribution to the multicast receivers.

In accordance with another embodiment, a router for providing multicast access control comprises a datastore storing multicast access control policies for a multicast service including a receiver access policy that controls which multicast receivers are allowed to receive packets from the multicast service and a sender access policy that controls which multicast sources are allowed to send packets to the multicast service for distribution to the multicast receivers and a controller configured to enforce the multicast access control policies for the multicast service.

In various alternative embodiments of the above-mentioned routing system and router, the sender access policy may include a tenant-based sender access policy that specifies at least one source tenant that is allowed to send packets to the multicast service. The receiver access policy may include a tenant-based receiver access policy that specifies at least one receiver tenant that is allowed to receive packets from the multicast service. The routers may accept multicast joins only from interfaces associated with the at least one receiver tenant. The routers may accept multicast joins only from interfaces associated with the at least one receiver tenant unless the tenant-based receiver access policy is overridden by configuration on one or more interfaces. At least one router may be configured to accept multicast joins from an interface that is not a specified receiver tenant. At least one router may be configured to reject multicast joins from an interface that is a specified receiver tenant. The routers may be configured to transmit membership query messages on interfaces associated with the at least one receiver tenant. The routers may be configured to drop membership report messages on any interface having a tenant that does not have access to the multicast service. The routers may be configured to exchange multicast information associated with the multicast service including identification of the multicast sources and the multicast receivers. Each router may be configured to transmit the router's multicast information to a central repository and to receive from the central repository multicast information for the other routers. At least the source router may be configured to determine, based on the exchanged multicast information, an optimal rendezvous point router for distributing the packets associated with the multicast service. The multicast source router may be configured to transmit unicast packets for the multicast service to each multicast receiver router associated with at least one multicast receiver. The multicast source router may be configured to join a multicast tree and to transmit a multicast packet to multiple multicast receiver routers.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 5 is a schematic diagram showing an exemplary topology segmented as one district with multiple neighborhoods.

FIG. 6 is a schematic diagram showing the same topology as FIG. 5 but segmented into multiple districts.

FIG. 7 is a schematic diagram showing a topology including two routers peering with each other.

FIG. 8 is a schematic diagram showing an example of redistributing BGP into services.

FIG. 9 is a schematic diagram showing an example of redistributing BGP into STEP.

FIG. 10 is a schematic diagram showing a topology including a multicast configuration with no receivers.

FIG. 11 is a schematic diagram showing the topology of FIG. 10 but now with router R2 having received IGMP joins on two of its interfaces.

FIG. 12 is a schematic diagram showing the same topology as FIG. 6.

FIG. 13 is a schematic diagram showing a topology including a service exchange between districts that causes a loop.

FIG. 14 is a schematic diagram showing the topology of FIG. 13 but including service exchange between districts with loop avoidance.

FIG. 15 is a schematic diagram showing a topology including source based routing within the same district.

FIG. 16 is a schematic diagram showing a topology including source based routing across multiple districts.

FIG. 20 is a logic flow diagram for source-based routing, in accordance with an exemplary embodiment.

FIG. 21 is a schematic diagram showing a topology including point-to-multipoint SVR routing.

FIG. 22 is a schematic diagram showing a topology including multicast proxy routing.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Definitions

Figure 1:
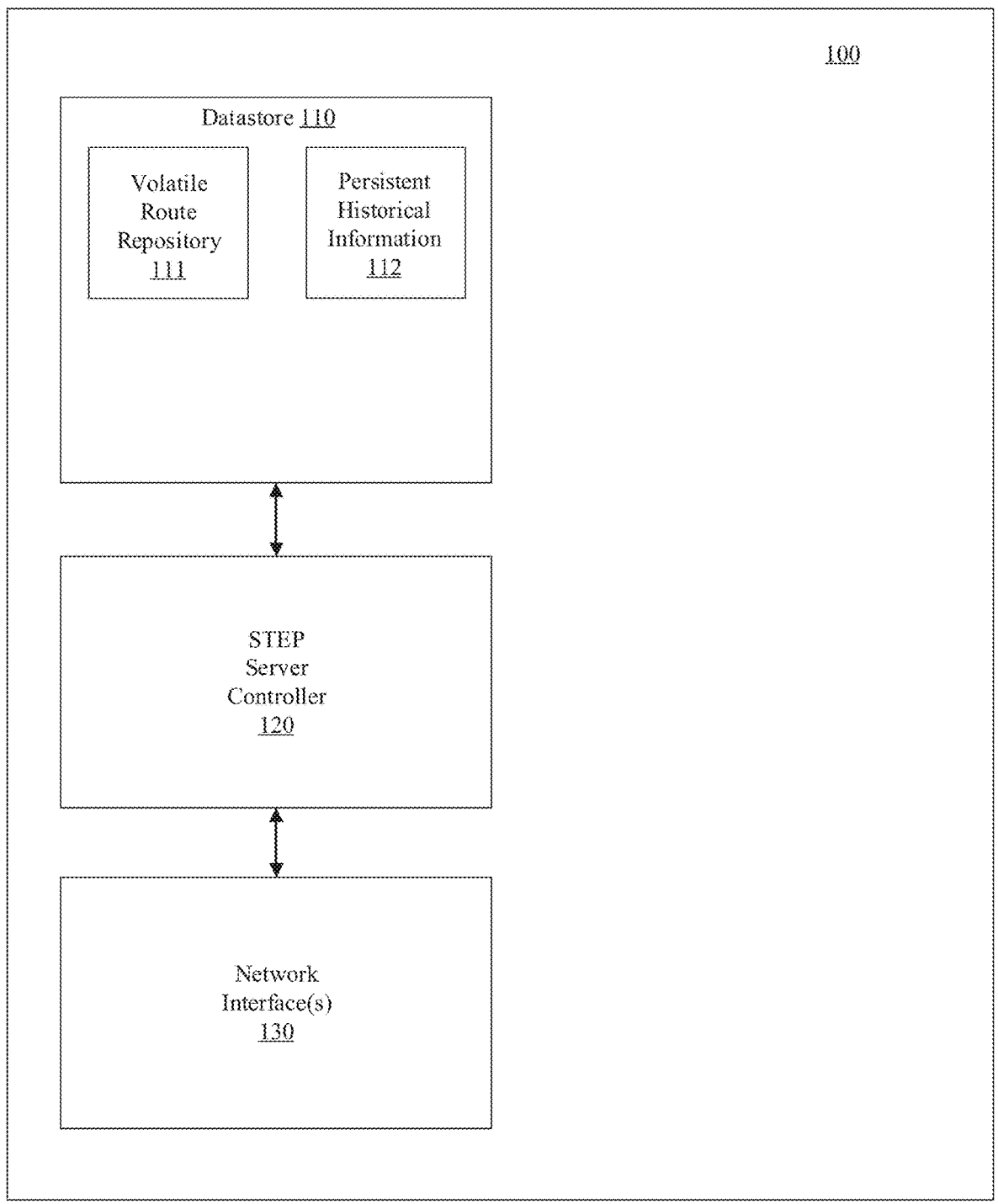
FIG. 1 is a schematic diagram showing major components of the STEP server 100, in accordance with one exemplary embodiment.

As used in this description and the accompanying claims, the following terms shall have the meanings indicated, unless the context otherwise requires:

STEP stands for Service and Topology Exchange Protocol, which is used to describe various mechanisms for distributing various types of service and topology state information among and between routers and for using such distributed service and topology state information in making intelligent routing decisions.

Authority is a single administrative domain that is comprised of a collection of routers; generally analogous to an Autonomous System (AS) in a BGP network. An authority can be a single network, a collection of networks, or single managed entity for a group of routers. In an exemplary embodiment, authorities are named with text strings. Authority names are unique and may be assigned/managed by a naming authority or other technique that guarantees uniqueness. In exemplary embodiments, a private naming authority is used, although in alternative embodiments a public naming authority (e.g., IANA or equivalent) may be used. In an exemplary embodiment, authority names are resource names that conform to RFC 1737.

Neighborhood is an IP network of reachability. All router interfaces configured to be within the same neighborhood are expected to be mutually reachable. This includes interfaces separated by network boundaries, NATs, and firewalls but are mutually reachable. In exemplary embodiments, a neighborhood is a label (string value) applied to a network interface that describes desired connectivity (peering relationships) between routers. Any two router interfaces within an Authority that share at least one neighborhood label are presumed to be connected to a common L3 network that intends those two interfaces to be capable of reaching one another. Assigning two interfaces to the same neighborhood causes the routers to create a peering relationship with one another. In an exemplary embodiment, every network interface on an SSR belongs to at least one neighborhood, and if a network interface is left unconfigured by the administrator, the SSR will automatically assign it a neighborhood name that is unique among all interfaces within the Authority. A network interface can be a member of multiple neighborhoods and can contain a user-ordered list of neighborhoods that all describe the same non-unique L3 network. In this context, a user ordered list specifies the ordering of the neighborhoods, where the first neighborhood listed will be considered the "primary" neighborhood, and will be the neighborhood associated with all inbound sessions arriving on that network interface for purposes of analytics data, redundancy state information, and other interface-specific metrics. Two network interfaces belonging to the same neighborhood are effectively treated as having a direct neighbor relationship, even if the communication path between the two network interfaces passes through one or more other routers. In an exemplary embodiment, in order to constrain which interfaces attempt to peer with one another and to avoid unnecessary peering relationships, each interface's neighborhood can be assigned a topology type as either mesh, hub, or spoke, where a mesh interface attempts to peer with all other neighborhood interface of type mesh or hub, a hub interface attempts to peer with all other neighborhood interfaces of type mesh, and a spoke interface attempts to peer with all other neighborhood interfaces of type mesh or hub.

District is essentially a collection of neighborhoods. Every router participating in a district will receive link state metrics about every other router interface within the same district. This information can be used to aggregate service state availability to other districts.

A "Tenant" is a single sub-network that is to be segregated and separated from all others, e.g., for security, manageability, and analytics. This is akin to VLAN or VxLAN or VRF. A Tenant is a text string assigned by an Authority or parent Tenant.

A "Service" is a single named application and is the target of a route. This is similar to an IP address after DNS resolution or CIDR block. A Service is named with a text string that normally matches the URL of a service. A Service is represented by a text string that is used within the routing protocol.

A "Service Group" is a portion of a sub-network (Tenant) that is to be segregated, e.g., for manageability and analytics. A Service Group is represented by a text string that is used within the routing protocol.

A "Qualified Service Name" or "QSN" is an addressable resource. This is a textual representation of a tenant, a service-group, or a service. In an exemplary embodiment, every QSN has one unique Authority and uses URI Generic Syntax defined by RFC 3986 in the form QSNI/Subtenant.Tenant.Authority/ServiceGroup/Service. Service Groups are optional, and should they not be used, the QSN can be shortened to not include this text. Some exemplary embodiments of QSNs, tenants, service-groups, and services are described in related U.S. patent application Ser. No. 15/054,781 filed Feb. 26, 2016 (now issued U.S. Pat. No. 9,985,883), which was incorporated by reference above.

SVR stands for Secure Vector Routing. This is how packets are forwarded between two peer SSRs in the 128T routing platform. SVR implements aspects of session-based routing as described in related U.S. patent application Ser. No. 14/833,571, now issued U.S. Pat. No. 9,762,485, which was incorporated by reference above.

A Vector is an attribute of a neighborhood on a given router interface, and can be used by administrators to exert control over the routing decision logic (path selection) employed by the router. Whereas neighborhoods describe the topology (peering relationships) between routers, vectors describe path preference for service traffic over that topology. Each neighborhood (within an interface) may contain the name of a vector, which is a label that allows administrators to ascribe some property to that neighborhood for influencing routing. A vector can also be thought of as a name for a peering relationship between two routers within a neighborhood. Once vectors are configured, administrators may assign priorities to those vectors within service-policy configuration elements, e.g., a service (via its policy) can indicate a preferred type of vector or hierarchy of vectors for a particular service. For example, a video conference service might be configured to use an MPLS vector if available and to use a basic Internet path vector otherwise. Furthermore, a service-policy can assert that certain vectors are never to be used for a given service. For example, an HD video conference service may be unusable or cost-prohibitive when sent over LTE, so in an exemplary embodiment the administrator can assign a priority of "never" to the LTE vector with respect to the HD video service. Additionally or alternatively, vectors can be associated with various metrics (e.g., cost or performance-based metrics) for use in selecting routes. For example, if a network includes vectors A, B, C, D with respective costs of 10, 20, 50, 60 and a route could use either vectors A/C or vectors B/D, then the router typically would select vectors A/C having an aggregate cost of 60 instead of vectors B/D having an aggregate cost of 80. Different routes to a particular destination can be computed by assigning different costs to links for different services, e.g., for purposes of web traffic, a particular link might have a cost X and for purposes of email traffic, the link might have a cost Y, such that routes for web traffic and for email traffic traverse different paths through the network even if both types of traffic arrive at the same egress router.

The terms "publish" and "advertise" (and variants thereof) are used interchangeably unless the context otherwise requires.

A "set" includes one or more members.

Introduction

In an exemplary embodiment, a routing system for distributing multicast routing information for a multicast service includes a plurality of routers including a multicast source router and a plurality of multicast receiver routers, the plurality of routers providing a multicast service, wherein the routers are configured to exchange multicast information associated with the multicast service including identification of multicast sources and the multicast receivers.

Exemplary embodiments are described herein with reference to Session Smart Routers (SSRs) of the type sold by 128 Technology of Burlington, Mass., although it will be understood by those of ordinary skill in the art that various aspects of the described embodiments can be applied to other networking devices either now or in the future to overcome the types of networking and configuration issues described herein.

As discussed above, service configuration of a large number of SSRs can be difficult. Furthermore, as networks are constantly changing, information regarding services and service reachability needs to be exchanged between SSRs, as network and application state is dynamic. For example, service routes are generally configured for services with well-known destinations—akin to static routes. In some cases, the services resort to routing in order to learn the nexthops. These routes can be learned in various ways, such as via a traditional routing protocol (e.g., OSPF, BGP, etc.), via static routes, or via connected routes. Each SSR may learn different routes by virtue of running different routing protocols. Routes need to be eventually applied to services, applied to applications, and/or distributed to other SSRs. If some routes are withdrawn, some of the services may become unavailable, and this state change needs to be propagated. Furthermore, SSRs currently do not have visibility into whether a service is available at the ultimate destination (last hop). This lack of visibility, from a networking perspective, can lead to incorrect routing of packets.

In exemplary embodiments, routers within a portion of a network (e.g., within an authority or district as discussed below, up to an including an entire network) implement a service and topology exchange protocol (referred to herein as STEP) to exchange service and topology state information such that each router in the portion of the network that participates in STEP (referred to hereinafter as a STEP router) obtains service and topology state information from all of the other STEP routers in the portion of the network and optionally also from STEP routers outside of the portion of the network. Among other things, STEP allows the STEP routers to propagate network state and network state changes as well as manage services across routers, e.g., as more routers become part of an authority or district. The network can be segmented into multiple portions, and a STEP router can be a member of multiple portions, thereby participating in STEP exchanges within each portion for which it is a member. The STEP routers in one portion can advertise services and routes both within the portion and outside of the portion. When advertising a service or route outside of the portion, the service or route can be advertised as an aggregated service or route, e.g., identifying one particular STEP router in the portion through which the service or route can be accessed and optionally including an aggregated metric for the aggregated service or route (e.g., loss, latency, jitter, and/or cost values for the aggregated service or route based on the metrics of individual links/paths associated with the service or route within the portion of the network). Among other things, such segment routing, e.g., segmenting the network and allowing for advertisement of aggregated services and routes across network segments, can reduce the amount of information flow needed to distribute the service and topology state information.

The STEP routers within each portion of the network are typically specified through configured relationships, e.g., specifying which STEP routers belong to a particular authority or district. From these configured relationships, the STEP routers can exchange service and topology state information directly or indirectly, as discussed further below. The service and topology state information can include traditional link-state information (e.g., obtained from a traditional routing protocol such as OSPF or BGP) as well as additional information such as service level agreement (SLA) information (e.g., the service level agreement for a particular service, and whether or not the service is operating within the service level agreement), path metrics (e.g., configured link speed, actual computed link speed, link state up/down, jitter, packet loss rate, latency, vector information, and/or cost values per path/vector), multicast membership and permission information, and other information relevant to making intelligent routing decisions. Among other things, STEP therefore provides more information to the STEP routers than would be available from a traditional routing protocol alone, allowing each STEP router to make more intelligent routing decisions including routing packets based on service level agreement (SLA) and path metrics, making intelligent multicast routing decisions, and supporting intelligent source routing, to name but a few ways that STEP can be utilized.

In certain exemplary embodiments, STEP is implemented using a centralized distribution system (referred to herein as the STEP server or STEP repository) for dynamically exchanging service and topology state information by and between routers so that the routers can make more intelligent routing decisions. Specifically, each router that participates in STEP (referred to hereinafter as a STEP router) dynamically transmits its own service and topology state information to the STEP repository and dynamically receives service and topology state information for one or more other STEP routers from the STEP repository based on configured relationships between STEP routers. The STEP repository is managed by a STEP server in any of a variety of network devices as discussed below, and each STEP router implements a STEP client with respect to this client-server model. Certain exemplary embodiments are described below in the context of this centralized distribution system, although it should be noted that STEP can be implemented using other mechanisms for distributing service and topology state information, some of which are described herein below.

It should be noted that STEP routers can include SSRs or other routers augmented with some or all of the STEP functionality described herein.

STEP is being developed to address the following challenges in current SSR network deployments, although it generally provides a mechanism for distributing information within the network that can be used for other purposes now or in the future:

Interaction with Multiple Routing Protocols

Provisioning is required to configure BGP over SVR between two SSR peers to exchange BGP routes between two SSRs. This does not scale well across multiple SSRs. There is also a need to map the route information from these legacy routing protocols into the SSR world of services and service-routes. STEP provides an easy way to enforce this. It also provides an extensible way to interact with any future legacy protocols (like ISIS, etc.) if needed or desired. With STEP, network administrators would be able to plug-in the SSRs with any legacy routers and map them to services and make them available to the whole network.

Multicast

With multicast (e.g., IGMP support), all multicast receivers for a group are learned by an SSR. With STEP, the receiver endpoints will be advertised via the STEP repository and the optimal replication/rendezvous point can be determined to send multicast packets to all receivers, e.g., the smallest tree needed to distribute the multicast packets.

End Point Availability

It is possible for a far end SSR to route services to another SSR where the service is no longer available. Service availability is not just limited to routes or path states. The final application state could be queried using health APIs as well and is not limited to just the link state alone to determine service state. Currently, SSRs work around this limitation using path and interface failover techniques that will not work in all cases, especially when there is total outage and when the services are unavailable on other routers as well. STEP can propagate the service availability information across the whole network so that each router can make intelligent decisions and minimize outages.

Pinpoint Service Outages in the Whole Network

STEP stores the service and topology state information in the STEP repository. Thus, the STEP repository generally has the whole view of the network at any given time, and the STEP repository also can store historical information as service and topology state information updates are received from STEP routers. This current and historical information can be used for any of a variety of purposes, such as, for example, troubleshooting service and topology problems, making network management decisions (e.g., to shut down a particular router, or to control what information a particular router advertises via the STEP repository), or even reverting to a prior network state (e.g., by "replaying" a sequence of network state changes), to name but a few. Service outages or heat-map views of the whole network can be easily generated at any given time. This helps with fault isolation and enhances the ability to debug network problems.

Scalability

STEP allows the network to easily scale and provides insights into the whole network. STEP also will help network administrators easily design and scale existing or new networks and provide insight into the service availability across the whole network. In certain exemplary embodiments, there will two manifestations of STEP referred to as "internal STEP" or "iSTEP" and "external STEP" or "eSTEP." Internal STEP is the protocol used to exchange services within an authority and is the primary focus of the following description. External STEP is the protocol used to exchange services across authorities and is discussed briefly in the following description.

Step Repository

An exemplary embodiment of STEP and the various network elements used with STEP is now described.

As discussed above, STEP routers participating in a STEP-enabled network publish service and topology state information that is maintained in a STEP repository by a STEP server. For convenience, the service and topology state information published by a given STEP router is referred to herein as a STEP document. In specific exemplary embodiments, the STEP document is a JavaScript Object Notation (JSON) encoded document, although other mechanisms may be used in various alternative embodiments (e.g., HTML or a binary coded document). Service providers also may publish information to the STEP repository, e.g., to advertise service information from their networks/authority. The STEP information received by the STEP server from the STEP routers and optionally also from the service providers is selectively distributed to other STEP routers and used by the STEP routers to intelligently route traffic to services and also react to network changes.

In certain exemplary embodiments, the STEP repository is built upon a highly efficient and scalable in-memory database that follows a publish-subscribe model, referred to herein as the Path Tree database. In exemplary embodiments, the STEP repository/server performs the collection and distribution of service and topology state information, and all of the routing decisions (both client publishing routing data and client using the data to perform routing, e.g., shortest-path first decisions) are done on the STEP routers and not on the STEP server. However, in certain alternative embodiments, the STEP repository/server can be configured to make or contribute to routing decisions.

The path tree database is used to store all data in the STEP repository. As the name suggests, each data set gets its own path in the path tree database. The following path definition format will be used to publish STEP related information from each STEP router in an exemplary embodiment:

/<authority-name>/<district-name>/<router-name>/step=<router document> where, authority-name: Name of the authority to which the router belongs district-name: Name of the district to which this router belongs.

router-name: Name of the router step: leaf of the path where the j son document is stored Districts are explained in detail in the following sections. For now, a district can be considered as a collection of neighborhoods and a way of segmenting routers within an authority.

Each STEP router publishes a set of router documents to the STEP repository. A STEP router can be a member of one or more districts, and each STEP router publishes one router document for each district of which it is a member. Each STEP router generally subscribes to the STEP documents of all other STEP routers within each district of which it is a member. In this way, each STEP router learns the service availability across each district of which it is a member and can apply algorithms on a per-service basis to determine the available paths for a service in the network. Each STEP router runs routing (e.g., SPF) calculations periodically and does not receive any end notifications from the server.

In an exemplary embodiment, the following types of information will be stored in the STEP repository:

Service availability within each router

Peer paths available from each router

External routes learned from other routing protocols if distributed into STEP

Each of these types of information are discussed in greater detail below.

The STEP repository provides a complete view of network service availability at any given time and also can maintain a history of the changes that happened in the network over a period of time. Among other things, this current and historical information can be used for debugging or fine-tuning service policies, e.g., to prioritize various services at different times of the day, and also can be used to effectively revert to prior network states if necessary or desirable. Other machine learning algorithms can also be applied to the data obtained from STEP repository to help influence the services in the network.

Path Tree Server as Step Repository

The path tree database is a lightweight, scalable, in-memory subscription datastore. It supports a socket-based publisher-subscriber model. The data set is stored as various paths, and clients can add watches on various paths to be notified of changes. An example is provided below.

/p1/p2/p3/key="test"

where,

/p1/p2/p3/key is the path test is the value.

STEP clients can create paths and also can subscribe for notifications on any path. For example, a client can add a watch on the path/p1/p2 and it will get notification when anything gets created/changed/removed under the/p1/p2 path.

Path tree clients store the data-set as JSON (although any data encoding can be used). Any further updates to the data-set will be sent as JSON patch documents (JSON diffs) as specified in IETF RFC 6902 entitled JavaScript Object Notation (JSON) Patch and available at https://tools.ietf.org/html/rfc6902, which is hereby incorporated herein by reference in its entirety. This provides an efficient way to update the states as well as notify watchers of the updates instead of sending the whole JSON file. This mechanism should work particularly well for routing change notifications where only a few routes maybe be advertised or withdrawn based on routing changes. So only those change notifications will be sent by the path tree clients.

The STEP server notifies all subscribers of any changes to the paths to which they have subscribed. The server preferably also keeps a history of all JSON diff updates to a particular path. These updates are considered as network path changes or route changes. Periodically, these diffs will be combined into one JSON document (by default, this is configured to be 100 diffs per path) to allow for rollover and aggregation.

The path tree server is stateless and is not a persistent datastore. If restarted, it loses all state information, and clients must re-populate the datastore with the latest states, i.e., the latest STEP documents.

In order to persist the states in the path tree server, a separate path tree client will listen to all paths on the server and store it in a time series database. This path tree client can either co-reside with the path tree server or it could be remote. This time series database can be used by analytics/web client to determine the network changes over time. This is discussed in greater detail below.

Step Repository/Server Location

The STEP repository and STEP server can be hosted virtually anywhere, although in practice they will reside in one of the following three locations:

Conductor

STEP server can be co-located on the Conductor. The Conductor is accessible by all routers, which is how the routers are initialized and bootstrapped. Thus, generally speaking, the Conductor would be the natural (e.g., default)

location for the STEP repository. If Conductor access from the routers is on a "lossy" network or has high latency, the STEP repository should be hosted on a server that is close to the routers or on the routers themselves.

A Common Server Accessible by all Routers

The STEP server can be located on a standalone server, separate from the Conductor. This generally would require implementation of secure access from all routers.

Routers Themselves (e.g., Data Centers)

There are several deployments where the connectivity to the Conductor is unreliable and may not be available for extended periods of time such that the routers would not be able to talk to each other. In these cases, route exchanges and forwarding should still be able to function without disruption. In order to achieve this, the STEP repository can reside on a router (generally a hub router) that can be accessed by all routers in that domain. It should be noted that a STEP router that hosts a STEP repository effectively acts as both a STEP server (for managing the STEP repository) and a STEP client (for transmitting service and topology state information to the STEP repository/server and for receiving service and topology state information from the STEP repository/server).

Step Server and Client Devices

As discussed above, the STEP repository and STEP server can be implemented in any of various types of devices such as, for example, a STEP router, the Conductor, or a server that is separate from the STEP routers and the Conductor. FIG. 1 is a schematic diagram showing major components of the STEP server 100, in accordance with one exemplary embodiment. Among other things, the STEP server 100 includes a datastore 110 and a STEP server controller 120. The datastore 110 includes a volatile memory in which the route repository is stored (referred to here as the Volatile Route Repository 111) and a persistent storage in which historical STEP information is stored (referred to here as Persistent Historical Information 112). The STEP server controller 120 typically includes a microcontroller and related peripherals with software that is stored in a tangible, non-transitory computer-readable medium and that is run on the microprocessor to implement one or more computer processes that perform STEP server functions described herein. When the STEP server 100 is implemented in a STEP router, the microcontroller on which the STEP server controller 120 is implemented may be the same microcontroller that runs other router functions such as computation of routes and routing of packets.

Figure 2:
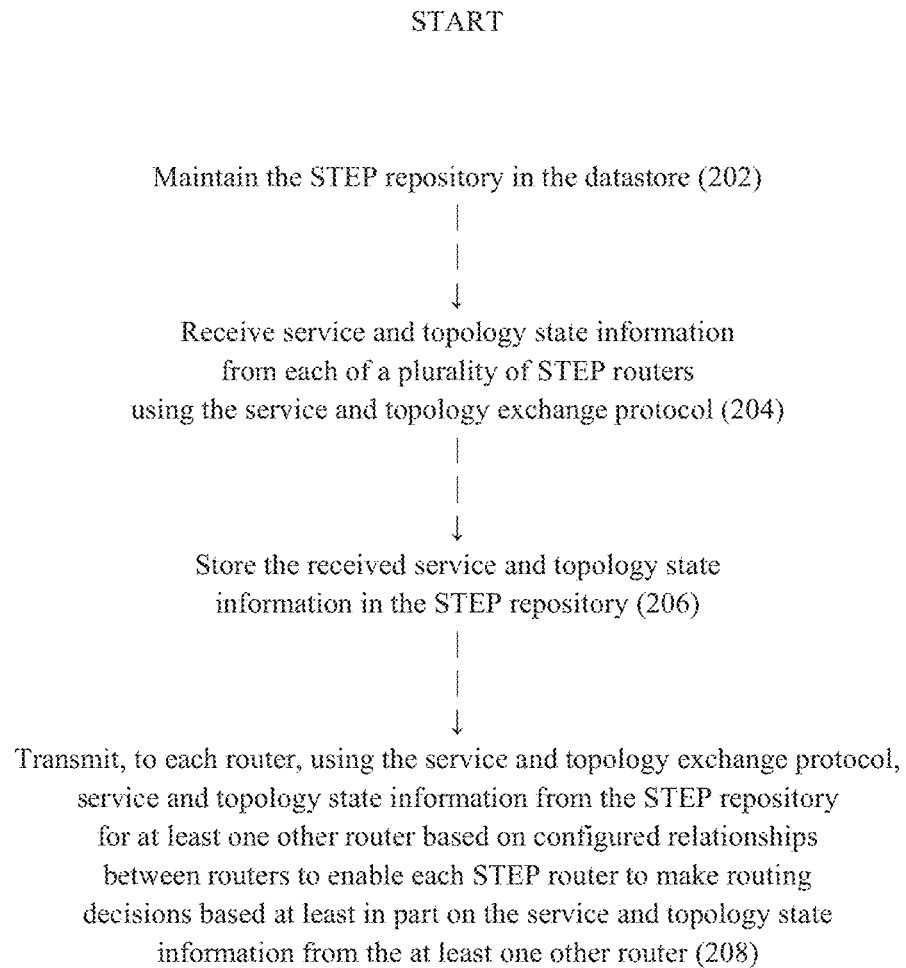
FIG. 2 is a logic flow diagram for the STEP server controller 120 in implementing the high-level STEP server functions, in accordance with one exemplary embodiment.

FIG. 2 is a logic flow diagram for the STEP server controller 120 in implementing the high-level STEP server functions, in accordance with one exemplary embodiment. In block 202, the STEP server controller 120 maintains the STEP repository in the datastore. In block 204, the STEP server controller 120 receives service and topology state information from each of a plurality of STEP routers using the service and topology exchange protocol. In block 206, the STEP server controller 120 stores the received service and topology state information in the STEP repository. In block 208, the STEP server controller 120 transmits, to each router, using the service and topology exchange protocol, service and topology state information from the STEP repository for at least one other router based on configured relationships between routers to enable each STEP router to make routing decisions based at least in part on the service and topology state information from the at least one other router.

Figure 3:
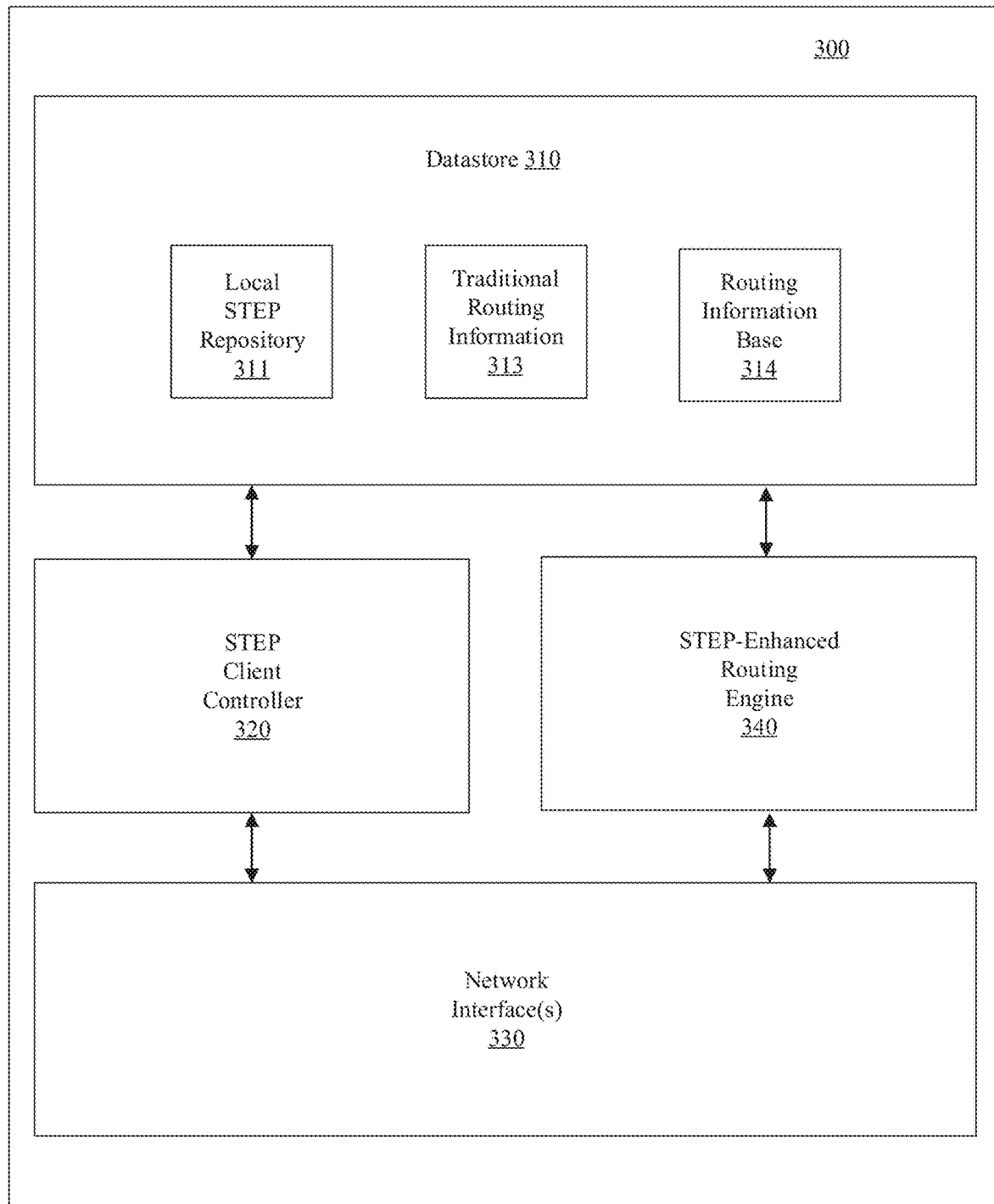
FIG. 3 is a schematic diagram showing major components of the STEP client 300, in accordance with one exemplary embodiment.

As discussed above, the STEP client is implemented in the STEP router. FIG. 3 is a schematic diagram showing major components of the STEP client 300, in accordance with one exemplary embodiment. Among other things, the STEP client 300 includes a datastore 310 and a STEP client controller 320. The STEP client controller 320 maintains in the datastore 310 a local STEP repository 311 that is used to store STEP documents received from the STEP server. The STEP client controller 320 typically includes a microcontroller and related peripherals with software that is stored in a tangible, non-transitory computer-readable medium and that is run on the microprocessor to implement one or more computer processes that perform STEP client functions described herein. The microcontroller on which the STEP client controller 320 is implemented may be the same microcontroller that runs other router functions such as computation of routes and routing of packets. With STEP, the router generally also includes a STEP-enhanced routing engine 340 that uses the STEP information in the local STEP repository 311 along with traditional routing information 313 stored in the datastore 310 (e.g., static routes, connected routes, and/or routes from a routing protocol such as OSPF or BGP) to determine routes for the routing information base 314 upon which the STEP-enhanced routing engine 340 routes packets.

Figure 4:
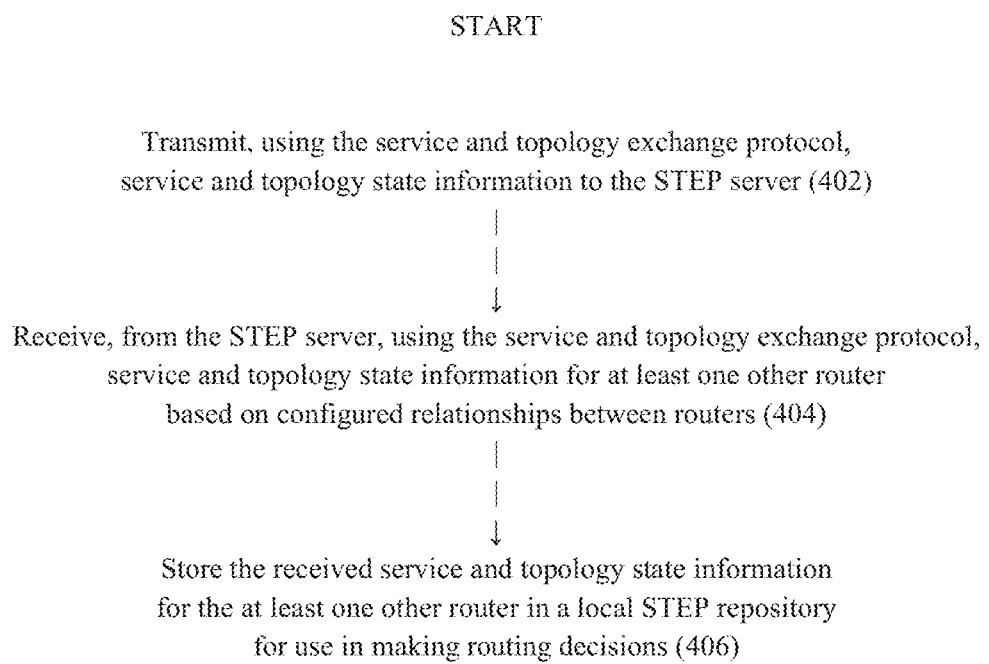
FIG. 4 is a logic flow diagram for the STEP client controller 220 in implementing the high-level STEP client functions, in accordance with one exemplary embodiment.

FIG. 4 is a logic flow diagram for the STEP client controller 220 in implementing the high-level STEP client functions, in accordance with one exemplary embodiment. In block 402, the STEP client controller 220 transmits service and topology state information to the STEP server using the service and topology exchange protocol. In block 404, the STEP client controller 220 receives, from the STEP server, using the service and topology exchange protocol, service and topology state information for at least one other router based on configured relationships between routers. In block 406, the STEP client controller 220 stores the received service and topology state information for the at least one other router in a local STEP repository for use in making routing decisions.

As discussed above, both the STEP server 100 and the STEP client 300 can be implemented in a router.

Step Repository Redundancy

In an exemplary embodiment, the path tree server is a non-persistent datastore. Path tree servers can be deployed with multiple instances to increase resilience. In the event there are multiple path tree servers, one of the servers will be elected as primary and the rest of the servers will be secondary servers. In exemplary embodiments, this election may be based on the lowest boot up timestamp or based on the highest configured priority, although other election schemes may be employed. Clients that connect to a secondary server will have their requests proxied to the primary server. Secondary server repositories will not maintain any path tree state within them.

In the event a primary server fails or reboots, one of the secondary servers will assume the role of the primary based on the election scheme (e.g., based on the next-lowest boot up timestamp or based on next-highest configured priority). Any requests to the old primary (which is now a secondary) will be relayed to the new primary. If the priority is configured, then once the failed primary with highest priority comes back up, it will assume leadership again. The new primary needs to be repopulated by all routers, as it saves no state.

All STEP servers (primary and secondaries) should be able to communicate with each other over a L2 or L3 network. The STEP servers can be configured with priorities. In an exemplary embodiment, the highest priority server will be the primary and the remaining servers will be secondary servers. The STEP primary can be configured taking into consideration the reachability constraints in the network. The next section describes the various locations where STEP server can reside.

Step Repository Configuration

The STEP repository location(s) and optional priority settings can be configured by the network administrator based on the needs of the network deployment. The data model changes for the STEP repository is given below.

```
grouping step-repo {
   leaf description {
      type string;
      description
         "A description about the STEP repository.";
         t128ext:example "STEP repository on conductor";
   }
   leaf address {
      type t128ext:hostv4-prefix;
      description
         "Address of the STEP server. This could be the IP address/FQDN of the Conductor,
standalone server or router where the STEP server is hosted.";
   }
   leaf priority {
      type uint8;
      default 0;
      description
         "The priority assigned to the STEP server. The STEP server with the highest priority
will become primary. If no priority is assigned to any servers, the server with the longest
uptime will be the primary.";
   }
container authority
{
   ...
   leaf-list step-repos {
      description "Location of the STEP repository";
      uses step-repo;
   }
   ...
}
```

The STEP server can be setup by configuring the following two parameters:

IP Address/FQDN

The STEP server can be identified using an IP address or Fully Qualified Domain Name (FQDN). The STEP server can be the Conductor, a standalone server, or a router itself. If this field matches the IP address/hostname of an interface on a router, then the STEP server will be setup on that router. A STEP service will be generated for each of these IP addresses with the corresponding service routes for each router so that the STEP clients on the routers can reach the STEP repository. This will be done by the config generator before the config is pushed down to all routers. More details are provided below.

Priority

This is an optional parameter which would be very useful in some network deployments. Priority indicates which server should be the primary server in the event there are multiple servers. By default, the server that has the longest uptime becomes the primary. However, with priority configured, the server with the highest priority will instead become the primary. Upon failure to become the primary, the next highest priority will become primary, and so on. If more than two STEP servers are deployed and some have priority configured and some do not, the one with the highest priority that is active will become primary. When all servers with priority configured are unavailable, uptime is used as a discriminator for the remaining servers. This becomes useful in deployments to specify primary servers on nodes which are reachable by all network elements. This could be even a router (e.g., in the event conductor or standalone server has lossy connections).

Step Document

In an exemplary embodiment, the STEP document is a JSON document published by each STEP router to the STEP repository. The protobuf definitions below illustrates the different fields that make up the JSON.

```
syntax = "proto3";
message IpPrefix {
   /* IP Address */
   string ipAddress = 1;
   /* Prefix length */
   int32 prefixLength = 2;
}
message ServicePolicy {
   /* Name of the service policy */
   string name = 1;
   /* Indicates the path has acceptable SLA */
   bool hasSla = 2;
}
message SlaValues {
   /* Latency in milliseconds */
   uint32 latency = 1;
   /* Loss in percentage */
   double loss = 2;
   /* Jitter in milliseconds */
   uint32 jitter = 3;
}
message PeerPath {
   /* Unique name identifying the path to a target 128T peer */
   string identifier = 1;
   /* Local interface hostname */
   string hostname = 2;
   /* Local interface IP address */
   string ipAddress = 3;
   /* Target peer name */
   string peerName = 4;
   /* Vectors associated with the path */
   repeated string vector = 5;
   /* SLA values */
   SlaValues slaValues= 6;
   /* List of service policies */
```

```
    repeated servicePolicy = 7;
}
enum RouteSourceType {
    District = 0;
    Authority = 1;
}
message RouteSourcePath {
    /* Source type */
    RouteSourceType sourceType = 1;
    /* Name of the source */
    string name = 2;
}
message ServiceNexthop {
    /* Vectors associated with the nexthops */
    repeated string vector = 1;
    /* District or authority list */
    repeated RouteSourcePath sourcePath = 2;
}
message RouteNexthop {
    /* Routing cost associated with the nexthops */
    repeated int32 cost = 1;
    /* District or authority list */
    repeated RouteSourcePath sourcePath;
}
message ServiceRoute {
    /* Name of the configured service-route */
    string name = 1;
    /* List of nexthops */
    repeated ServiceNexthop nexthop = 2;
}
message Route {
    /* Ip prefix associated with the service */
    IpPrefix ip_prefix = 1;
    /* Next hop associated with the route */
    repeated RouteNexthop routeNexthop = 2;
}
message ActivePeerPath {
    /* Unique name identifying the active path to a target 128T peer */
    string identifier = 1;
}
message Service {
    /* Service name */
    string name = 1;
    /* Routes associated with the service */
    repeated Routes routes = 2;
    /* Configured service-routes */
    repeated ServiceRoute serviceRoutes = 3;
}
enum Protocol {
    Connected = 0;
    BGP       = 1;
    OSPF      = 2;
    Static    = 3;
}
message ExternalRoute {
    /* Protocol that distributed the external route */
    Protocol protocol = 1;
    /* External routes distributed into step */
    repeated Route route = 2;
}
message Node {
    /* Name of the node */
    string name = 1;
    /* Services */
    repeated Service service = 2;
    /* Paths between peering routers */
    repeated PeerPath peerPath = 3;
    /* External routes distributed into Step */
    repeated ExternalRoute externalRoute = 4;
    /* InterConnect denoting the path between nodes */
    Repeated string interconnect = 5;
}
message Router {
    /* Name of the router */
    string name = 1;
    /* Nodes in a router */
    Repeated Node nodes = 2;
}
```

The protobuf definitions above provide a scheme for third-party routers to interact with STEP routers by publishing their router documents as JSON documents. Protobufs have accessors to get/set values and they can be converted to and from JSON. The following is an example JSON representation of the document:

```
{
    name : "EastRouter"
    nodes : [ {
        name: "node1",
        peerPaths : [
            {
                identifier : "peer1+3.5.6.7+node1+intf1+vlan0",
                hostname : "EastRouter.node1.intf",
                peerName : "peer1",
                vector : [ "broadband", "mpls" ],
                service-policy : [ {
                    name : "test",
                    hasSla : true
                } ],
            }
            {
                identifier: "peer1+4.5.6.7+node1+inft11+vlan0",
                ipAddress : "10.2.3.4",
                peerName : "peer1",
                vector : ["lte"],
                slaValues : {
                    loss : 10,
                    latency : 30,
                    Jitter: 10
                }
                service-policy : [ {
                    name : "test",
                    hasSla : false
                } ]
            }
        ],
        service : [ {
            name : "database",
            route : [ {
                ipPrefix : "1.2.3.4",
                prefixLength : 32,
                nexthop : [ {cost: 10 } ]
            },
            ipPrefix : "2.5.6.0",
            prefixLength : 24
            service-route : [ {
                name : "service-route1",
                serviceNexthop : [ {
                    vector : [ {"red", "blue"} ]
                } ],
            } ]
        } ],
        external-routes : [ {
            route : [ {
                ipPrefix : "192.168.3.0",
                prefixLength : 24,
                nexthop : [ {cost: 10 } ],
            } ],
            protocol : "bgp"
        } ],
        interconnect : [ {"fabric1"} ]
    },
    {
        name: "node2",
        peerPaths : [
            {
                identifier : "peer2+3.5.6.7+node2+12+0",
                hostname : "EastRouter.node2.intf",
                peerName : "peer2",
                vector : ["mpls"],
                slaValues : {
                    loss : 20,
                    latency : 10,
                    jitter : 0
                },
                service-policy : [ {
                    name : "test",
```

-continued

```
            hasSla : false
        } ],
      }
    ],
    service : [ {
      name : "database",
      route : [ {
        ipPrefix : "2.5.6.0",
        prefixLength : 24
      } ],
      service-route : [ {
        name : "service-route2",
        serviceNexthop : [ {
          vector : [ {"red"} ]
        } ]
      } ]
    } ]
  }
```

The STEP document has the following fields, which will be populated by each network element.

1. Router

Router is the top-level entity, which encompasses one or more nodes. Each STEP document belongs to a router. A router can have one or more nodes connected via an interconnect (backplane).

2. Node

Each node lists the services, peer-paths reachable from the node, service availability, external routes distributed by other protocols, and the interconnects available between multiple nodes. The presence of interconnects will be used to determine reachability of service routes between the nodes. If the interconnect is absent from the document, this indicates that the path between the nodes are down and some services hosted by the other node(s) will not be accessible via "this" node. Any peer paths via the node that is down (absent from the document) will not be considered for service reachability.

3. Services

The Services section denotes all services that are being advertised by each router. A router advertises services if a route matches the configured service prefix or if there is a configured service route. In short, a service entry for a router essentially means that the router can provide that service.

Services are advertised with prefixes and nexthops. If the prefixes have nexthops associated with them, it means that the routes are learned from routing protocols and the nexthops are from routing. The prefixes within a service may be withdrawn if the route that contributes to this prefix gets withdrawn. The narrower of the configured service prefixes gets advertised. For example: if the service is configured with a prefix of 10.10.10.0/24 and the route that gets applied is 10.10.10.1/32, then the service will be advertised using the 10.10.10.1/32 prefix, as it is narrower. The prefixes from a routing protocol get applied to a service only if it is distributed into STEP. More details about this are described below.

Services can also have prefixes without nexthops. These are prefixes obtained directly from the service address configuration, for which there are configured service routes. Service routes can be considered similar to static routes in that they are explicitly configured but are service-specific.

The Service route section indicates the configured local nexthops available. This section will only advertise the nexthops that are reachable. If the next hops are down, the service route section will be empty.

4. Peer Path

Peer paths indicate all paths available from a given router to each of the peers. This information can be used to build the graph representing the network topology connections between routers.

Since SSR routing is service oriented, the peer paths themselves do not give a complete picture of the service availability. Each service has a service policy associated with it, and each of the peer paths should be within the acceptable SLA. Every peer path has a list of service policies associated with it and indicates whether it is within acceptable SLA for each policy. Each service can therefore use this service policy information to determine if these paths are usable for a particular service. In an exemplary embodiment, the service policy for SLA values includes a configurable hold down timer, and the path must remain within SLA during this timer before being advertised as within acceptable limits to the STEP server. It is the responsibility of the router (STEP client) to honor the hold down timer and SLA thresholds for the generation of its STEP document.

SLA values are also advertised per peer path. In an exemplary embodiment, there is a configurable timer value per adjacency that can be setup to update these values periodically. SLA incorporates loss, latency and jitter values of the path. These typically are measured every few seconds on the routers themselves, but will not be updated in the STEP repository that frequently in order to avoid flaps (e.g., a situation in which a router alternately advertises a destination via one route then another or as unavailable and then available again in quick sequence, or alternatively advertises an interface as down and then up in quick succession) and to avoid frequent routing updates that can prevent network convergence. These values may be updated, for example, every 5 minutes (as a rolling average), which can be overridden. These values, if advertised, will be incorporated into the routing (e.g., SPF) calculation to determine the best path based on SLA.

5. External Routes

External routes refer to the routes that are distributed into STEP from some other routing protocols (e.g., BGP routes redistributed into STEP). This is a case where the routing protocol is not advertised into any services, just into STEP, so that all other routers can learn this route. These can be redistributed back into the BGP at another STEP router.

Neighborhoods

A neighborhood is a label applied to a network interface to indicate network connectivity. When two network interfaces share the same neighborhood, it implies that they have network reachability. Neighborhoods can be published by each router as part of the STEP document, including its vector, the network interface, and tenancy information. This can be used to determine peer path connectivity between routers. An example configuration is given below.

```
network-interface
{
    name test-interface
    vlan 0
    neighborhood test
    ...
}
```

In an exemplary embodiment, neighborhoods from all router configurations are read by the Conductor, and adjacency configuration is generated by the config generation code. The adjacency configurations on each router serve as the available peer paths. These peer paths will be advertised as part of the STEP document. This will allow each peer to create a topology graph of the whole network on a per service basis.

Districts

A district is a logical grouping of neighborhoods. STEP documents generally are shared between all routers within the same district. There is no strict demarcation for districts and it instead depends entirely on how the network topology is segmented. This section provides examples of how the same network topology can be segmented as one district or multiple districts.

Single District

FIG. 5 is a schematic diagram showing an exemplary topology segmented as one district with multiple neighborhoods. In this example, the district name is "common" and there is a hub and spoke topology. Routers DC1 and DC2 are the hubs. Routers Br1 and Br2 are spokes connected to router DC1. Routers Br3 and Br4 are spokes connected to router DC2. The following neighborhoods are defined:

1. N1

All WAN interfaces of DC1, Br1 and BR2 are in neighborhood N1. This neighborhood is part of district "common."

2. N2

All WAN interfaces of DC2, Br3 and BR4 are in neighborhood N2. This neighborhood is also part of district "common."

3. N3

The WAN interface reachable between DC1 and DC2 are in neighborhood N3. This neighborhood is also part of district "common."

In this example, all three neighborhoods have been defined as part of the same district "common." This means that all six routers will publish their STEP documents into the same path of the STEP server. The following shows an example path where the documents are published:

```
<authority-name> : auth128
/auth128/common/DC1/step=<json>
/auth128/common/DC2/step=<json>
/auth128/common/Br1/step=<json>
/auth128/common/Br2/step=<json>
/auth128/common/Br3/step=<json>
/auth128/common/Br4/step=<json>
```

Multiple Districts

FIG. 6 is a schematic diagram showing the same topology as FIG. 5 but segmented into multiple districts. In this example, there are three districts, specifically a district named "east" including routers DC1, Br1, and Br2; a district named "west" including routers DC2, Br3, and Br4; and a district named "central" including routers DC1 and DC2. Each STEP router publishes its STEP documents in its respective paths. The following shows example paths for the districts shown in FIG. 6:

```
<authority-name> : auth 128
District east
/auth128/east/DC1/step=<json>
/auth 128/east/Br1/step=<json>
/auth128/east/Br2/step=<json>
District west
/auth128/west/DC2/step=<json>
/auth128/west/Br3/step=<json>
/auth128/west/Br4/step=<json>
```

-continued

```
District central
/auth128/central/DC1/step=<json>
/auth128/central/DC2/step=<json>
```

It can be seen that router DC1 published its STEP document in two districts, east and central, and router DC2 also published its STEP document in two districts, west and central. Routers Br1 and Br2 only peer with router DC1 in the east district, so routers Br1 and Br2 only published their STEP documents in the east district because their network topology and service availability, on a per branch basis, need not be exposed to the other districts. Similarly, routers Br3 and Br4 only peer with router DC2 in the west district, so routers Br3 and Br4 only published their STEP documents in the west district because their network topology and service availability, on a per branch basis, need not be exposed to the other districts. If all the branches were connected as a full mesh, then each branch router would need to know the service availability and reachability to every other branch, but that is not the case here. In this example, router DC1 can effectively hide all of its branches from router DC2, and vice versa.

In an exemplary embodiment, each router that is part of multiple districts will aggregate the service and route information from one district and advertise that to another district. Hence, the STEP document for the same router on two different districts will look different. Additional details on how the services are exchanged between districts are provided below.

District Configuration

Below are the data model changes needed to configure a district, in accordance with one exemplary embodiment. District is a container at the authority level containing a list of neighborhoods. Each neighborhood can have a list of districts associated with it.

```
container authority {
    ...
    list district {
        key "name";
        ordered-by user;
        Description "Districts in the authority.";
        leaf name {
            type t128ext:district-id;
            description
                "Name of the district.";
        }
        leaf-list neighborhood {
            type t128ext:neighborhood-id;
            description
                "Neighborhoods which belong to this district";
        }
    }
}
```

Default District

In an exemplary embodiment, associating a neighborhood to a district is optional. When a neighborhood is not associated explicitly with a district, it will be assigned the district "default-district". This way, it is not mandatory to configure districts if the topology only demands a single district. In the topology described with reference to FIG. 5 above, if all neighborhoods were configured without districts rather than with district "common," then the pathTree server would have the following paths.

```
<authority-name> : auth 128
/auth 128/default-district/DC1/step=<json>
/auth128/default-district/DC2/step=<json>
/auth 128/default-district/Br1/step=<json>
/auth128/default-district/Br2/step=<json>
/auth128/default-district/Br3/step=<json>
/auth128/default-district/Br4/step=<json>
```

The following rules are used when configuring neighborhoods and districts in one exemplary embodiment:

- If a router R1 has an interface with neighborhood N1 in district D1 and another interface with no neighborhood configured, R1 will publish the router document under district D1 only. It will not publish a document under "default-district."
- If a router R1 has an interface with neighborhood N1 in district D1 and another interface in another neighborhood N2 which is not part of any districts, R1 will publish STEP documents under D1 and "default-district."
- If router R1 has no neighborhoods configured on any of its interfaces, it will not publish any STEP document.

Routing Calculations Using Step

The routing (e.g., SPF) calculation runs on demand on a router using a hold down timer, e.g., if there are any updates from the STEP repository (including local changes), it will be scheduled to recalculate the paths after a predetermined amount of time, e.g., five seconds. This generates service-based routes and nexthops. These will be pushed down to the routing agent to setup Forwarding Information Base (FIB) entries. The firing of the timer indicates that it is time to compute paths, and there is no end notification from the server.

Once a router reads all the STEP documents, it will run its routing algorithm (e.g., SPF via Dijkstra's algorithm) across all available paths advertised by other routers on a per service basis. In some cases, this will be run on a per service prefix if each of the service prefixes has a different nexthop (this could be the case for prefixes distributed into a service from other protocols).

The cost of each path is published in the STEP document and the service policy associated with each service can be obtained from config. Based on this, the logical network topology is different per service. The SPF calculates a best path and an alternate loop free path for each service. The alternate path will be used as a backup in the event the primary path is not available.

SLA values are advertised per peer path periodically. The time for these updates can be configured per adjacency. Each peer path advertised also indicates if the SLA per service policy is being met. Service policy will have a path hold down timer field which can be configured to control these updates. The following are example data model changes for path SLA update:

Data model changes for path SLA update

```
list network-interface {
  ...
  list adjacency {
    leaf sla-update-timer {
      type uint64;
      units seconds;
```

Data model changes for path SLA update

```
      default "300";
      Description "Periodic time for updating per path SLA.";
    }
  }
  ...
}
```

Data model changes for SLA hold down timer

```
list service-policy {
  ...
  leaf sla-hold-down-timer {
    type uint64;
    units seconds;
    default "60";
    description
      "Hold down time for SLA to be within acceptable limits before declaring the path as up";
  }
  ...
}
```

Service Exchange

In an exemplary embodiment, the following types of services are available on a router:

a) Services with authority wide scope.

b) Local Services that are local to the router or shared between N routers.

c) Hosted services that are for services hosted by the router for local access.

d) Application Identification services that are local to the router.

Of these service types, STEP only advertises the following services in the STEP document in an exemplary embodiment:

a) Services with authority wide scope.

b) Local Services that are shared between more than one router. If the service is local to that router, then it will not be advertised.

The other two types of services are only relevant locally to the router and therefore will not be published in the STEP document in an exemplary embodiment.

FIG. 7 is a schematic diagram showing a topology including two routers peering with each other. In this example, router R2 has a service-route for service S1 and there are two peer paths between routers R1 and R2. Consider, for example, that service S1 is configured with prefix 1.2.3.0/24 and with service-route on router R2.

Router R1

Obtains service S1 via configuration

Has no routes that match the service prefix S1

Has two peer paths

Router R1 does not have any services to advertise, as it has no routes matching that service nor any service nexthop configured. Thus, the following is an example STEP document for router R1:

```
{
  node : [ {
    name : "node2",
    peerPaths : [
      {
        identifier : "peer2+3.5.6.7+node2+dev1+intf1",
```

-continued

```
        hostname : "R2.node2.intf1",
        peerName : "peer2",
        vector : [ "mpls" ]
      },
      {
        identifier : "peer2+3.5.6.7+node2+dev2+intf2",
        hostname : "R2.node2.intf2",
        peerName : "peer2",
        vector : [ "broadband" ]
      }
    ]
  } ]
}
```

From the STEP document above, router R1 does not advertise any services. It does, however, have peer paths to the east router, R2.

Router R2

Obtains service S1 via configuration

Has no routes that match the service prefix S1

Learns about a local service-route on the node N1 via configuration.

Has two peer paths

The following is an example STEP document for router R2:

```
{
  node : [ {
    name : "node2",
    peerPaths : [
      {
        identifier : "peer2+3.5.6.7+node2+dev1+intf1",
        hostname : "R1.node2.intf1",
        peerName : "peer2",
        vector : [ "mpls" ]
      },
      {
        identifier : "peer2+3.5.6.7+node2+dev2+intf2",
        hostname : "R1.node2.intf2",
        peerName : "peer2",
        vector : [ "broadband" ]
      }
    ]
    service : [ {
      name : "S1",
      route : [ {
        ipPrefix : "1.2.3.0",
        prefixLength : 24
      } ],
      service-route : [ {
        name : "service-route1",
        serviceNexthop : [
          { vector : "red" }
        ],
      } ]
    } ]
  } ]
}
```

For router R2, service S1 is advertised as part of the STEP document with a service-route. This simply means that service S1 is available on router R2. When router R1 receives the STEP document of router R2, it discovers that the service S1 is available on router R2, and since the peer path is above the SLA, it would set up a service topology for service S1 from router R1 to router R2. When router R2 receives the STEP document from router R1, it finds no services are being advertised. Hence, the only nexthop for service S1 will be the configured service route on router R2. The above example indicates how the services are exchanged among multiple routers within the same district.

Removal of a Router

A router may be become unavailable for any of a variety of reasons, such as, for example, a failure of the router, unavailable or poor communication connectivity to the router, a shutdown of the router by a network administrator, or removal of the router from the network configuration (e.g., through a notification to the STEP server). Such unavailability can be conveyed to the STEP repository and, from there, propagated to other routers that subscribe to updates for the now-unavailable router. For example, if the router fails or is shut down, or if communication to the router is interrupted, the router may stop communicating with the STEP server/repository, in which case the STEP server may (possibly after trying a predetermined number of times to re-establish communication with the server) update the STEP repository to indicate that the router is unavailable, e.g., by removing that router's state information from the STEP repository or by updating that router's state information to indicate unavailability. Similarly, if the router is removed from the network configuration, the STEP server may update the STEP repository to indicate that the router is unavailable, e.g., by removing that router's state information from the STEP repository or by updating that router's state information to indicate unavailability. In any case, the STEP server may immediately notify other routers that subscribe to updates for the now-unavailable router that the router is now unavailable, in which case these other routers may re-calculate one or more routes to avoid the now-unavailable router.

Redistributing Protocols into Step

STEP routers often need to interact with other routing protocols like BGP, OSPF etc., in order to learn routes. Instead of running these protocols in the core, STEP routers have the unique ability to distribute these routes selectively into STEP. In one specific exemplary embodiment, the following routing protocols can be distributed into STEP:

a) BGP b) OSPF c) Static d) Connected

The following is an exemplary configuration for distributing routing protocols into STEP:

```
grouping redistribution {
  typedef redistribute-into-step {
    type enumeration {
      enum connected {
        description "Interface routes";
      }
      enum bgp{
        description "BGP routes";
      }
      enum static {
        description "Static routes";
      }
      enum ospf {
        description "OSPF routes";
      }
    }
  }
  list redistribute {
    key protocol;
    description
      "List of routing protocols to redistribute into STEP";
    leaf protocol {
      description
        "The routing protocol to redistribute into STEP";
      type redistribute-into-step;
    }
  }
  leaf-list service {
```

-continued

```
        description
            "List of services to which the routes are applied.";
        type auth:service-ref;
      }
    }
  }
  augment "/t128:config/authy:authority/authy:router/rt:routing" {
    list step {
      key name;
      description "STEP instance configuration";
      max-elements 1;
      leaf name {
        type string
        description "STEP instance name";
      }
      uses redistribution;
    }
  }
}
```

This can be extended in the future to apply filter policies on communities, peer group, etc., to filter routes at a more granular level. In an exemplary embodiments, there are two ways these routes can be redistributed into STEP:

a) Redistribute into selected services
b) Redistribute as external routes

Redistribute Protocols into Services

FIG. 8 is a schematic diagram showing an example of redistributing BGP into services. In this example, router R1 is peered with router R2, and router R2 is BGP peering with a non-STEP router (R3). Consider the following exemplary configuration on router R2 where BGP is redistributed into service S1 via STEP:

| Step |
|---|
| name : "step1"<br>redistribute<br>  protocol : bgp<br>service : [ { "S1"} ] |

Now, consider the same service S1 as in the previous example with the same prefix 1.2.3.0/24. In this case, S1 has no service routes configured. The idea is to learn routes from BGP and redistribute them into service S1. For this example, it is assumed that only one route is learned via BGP, specifically route 1.2.3.4/32.

Router R1
  Obtains service S1 via configuration
  Has no routes that match the service prefix S1
  Has two peer paths Router R1 does not have any services to advertise, as it has no routes matching that service nor any service next-hop configured. The following is an example STEP document for router R1:

```
{
  node: [ {
    name: "node2",
    peerPaths : [ {
      identifier: "peer2+3.5.6.7+node2+12+0",
      hostname : "R2.node2.intf",
      peerName : "peer2",
      vector : [ "mpls" ]
    } ]
  } ]
}
```

From the STEP document above, it is clear that router R1 is not advertising any services. It has peer paths to the east router.

Router R2
  Obtains service S1 via configuration
  Has BGP routes that match the service prefix S1. The narrower prefix is advertised.
  Has two peer paths
  The following is an example STEP document for router R2:

```
{
  node: [ {
    name : "node2",
    peerPaths : [ {
      identifier : "R1+3.5.6.7+node2+12+0",
      hostname : "EastRouter.node2.intf",
      peerName : "peer2",
      vector : [ "mpls" ]
    } ],
    service : [ {
      name : "S1",
      route : [ {
        ipPrefix : "1.2.3.4",
        prefixLength : 32,
        nexthop : [ { cost : 10 } ]
      } ]
    } ]
  } ]
}
```

The nexthop is provided as cost. Since legacy routing protocols are not aware of vectors, the cost of the route is used directly. This cost will be used when calculating the best path along with the vector magnitudes on each path. In an exemplary embodiment, AS path length will be converted into a cost by multiplying the number of ASs in the path with a constant (e.g., 10) and the cost will be advertised in the nexthop. The AS-path also could be advertised in the document to propagate it in the future for transit cases.

For router R2, service S1 is advertised as part of the STEP document with a narrower prefix and with a nexthop. This means that service S1 is available on router R2. Router R2 published service S1 as part of its router document because:

BGP was redistributed into the service S1 in router R2
  The route learned from BGP was a subset of the service prefix The same can be done for other protocols listed in the enumeration, namely static, connected and OSPF.

Redistributing Protocols as External Routes

With this option, the routes learned from BGP will be distributed into STEP as external routes. One use case where this option is useful is to advertise the connected routes of peer routers into BGP where these serve as reverse routes for downstream non-SSRs. However, this is not considered a normal mode of operation and should be the least preferred way of advertising routes, as STEP is not considered as a protocol to carry legacy routes across the network.

FIG. 9 is a schematic diagram showing an example of redistributing BGP into STEP. In this example, router R2 learns routes via BGP by peering with another router R3. In this case, router R2 is configured to distribute BGP into STEP. In this example, these routes are not distributed into services. This is an important distinction from the previous example, where the routes were distributed into services. Consider this configuration on router R2 where BGP is redistributed into STEP:

Step
  name: "step 1"
  redistribute
    protocol: bgp

In this case, the routes show up the in external route section of the STEP document of router R2. It should be noted that router R2 does not advertise the service S1 any more, as there are no routes that match the service.

Router R2
  Obtains service S1 via configuration
  Has no routes that match the service prefix S1 as BGP is not distributed into S1 service
  Has external routes as BGP is distributed into STEP
  Has two peer paths
  The following is an example STEP document for router R2:

```
{
  node : [ {
    name : "node2",
    peerPaths : [ {
      identifier : "R1+3.5.6.7+node2+12+0",
      hostname : "EastRouter.node2.intf",
      peerName : "peer2",
      vector : [ "mpls" ]
    } ]
    external-routes : [ {
      route : {
        ipPrefix : "1.2.3.4",
        prefixLength : 32,
        nexthop : [ {cost : 10 } ]
      },
      protocol : "bgp"
    } ]
  } ]
}
```

The protocol section in the external-routes section indicates which protocol was distributed into STEP. This document indicates that route 1.2.3.4/32 from BGP was distributed into STEP. This does not mean that this route was distributed back to another protocol on router R1. The presence of this route does not affect any services, as it will NOT be applied on any services. In certain exemplary embodiments, the only way these routes can be used is if one of the peering routers distribute these external routes back into BGP. Additional details of this are provided below.

Redistributing Step into BGP

Each router can learn services and routes from the STEP repository and redistribute them back into BGP. The redistribution can be more granular at the service level, where a set of services can be redistributed. Some exemplary data model changes for this are shown below, highlighted in bold.

This extension to the existing configuration provides a list of services that can be distributed into BGP. By default, with the service enumeration, all services will be redistributed into BGP.

| New enum in BGP redistribution |
| --- |
| grouping redistribution {<br>  typedef redistribute-into-bgp {<br>    type enumeration {<br>      enum connected {<br>        description "Interface routes";<br>      }<br>      enum service {<br>        description "Service routes";<br>      }<br>      enum static {<br>        description "Static routes";<br>      }<br>      enum ospf {<br>        description "OSPF routes"; |

| New enum in BGP redistribution |
| --- |
|     }<br>    enum step {<br>      description "Routes learned through STEP";<br>    }<br>  }<br>}<br>Augment BGP routing policy config.<br>module routing-policy-config {<br>namespace "http://128technology.com/t128/config/routing-policy-config";<br>........<br>  identity service-filter {<br>    base filter-type;<br>    Description "Filter based on services";<br>  }<br>  identity service-filter-condition {<br>    base condition-type;<br>    Description "An service filter condition";<br>  }<br>  identity step-external-routes-condition {<br>    base condition-type;<br>    Description "STEP external routes condition";<br>  }<br>  ........<br>}<br>augment "/t128:config/authy:authority" {<br>  container routing {<br>    description "authority level routing configuration";<br>    leaf service {<br>      when "../../type = 'rp:service-filter'";<br>      description "The serivce to match";<br>      type auth:service-ref;<br>    }<br>    must "../type != 'rp:service-filter' or service" {<br>      error-message<br>        "A service-filter rule must include a service.";<br>    }<br>    ...<br>  }<br>  list policy {<br>    key name";<br>    description<br>      "A construct for processing which consists of a set of<br>      statements executed in sequence";<br>    t128-codegen:base-object;<br>    leaf name {<br>      description "A unique name used to identify the policy";<br>      type t128ext:name-id;<br>    }<br>    leaf service-filter {<br>      when "../type = 'rp:service-filter-condition'";<br>      Description "The service filter name";<br>      type filter-ref;<br>    }<br>    must "type != 'rp:service-filter-condition' or " +<br>      "service-filter" {<br>      error-message<br>        "A service-filter-condition must include " +<br>        "a service-filter.";<br>    }<br>    ...<br>  }<br>} |

The "step" enumeration within protocol denotes all external routes that were learned via STEP. These are routes that do not match any services but were distributed into STEP via other protocols (e.g. BGP, connected, static, etc.).

The "service" enumeration will distribute all services prefixes learned from other routers into BGP if they are present in the router document, and will withdraw them if absent. The redistribute command has been extended to provide a list of services that can be distributed into BGP in case not all service prefixes need to be exposed. This lets each router have finer control over the services it chooses to advertise into BGP.

Multicast Service

Multicast has many applications where a source needs to replicate packets to one or more receivers. Currently, SSRs support unicast services which are delivered to one destination. Unicast services do not take into account multicast protocols like IGMP protocols, which are used to indicate which receivers are interested in a certain multicast group.

Access policy requirements for multicast services are also different from that of unicast services. Unicast services generally have access policies only for the source, whereas multicast services would benefit from access policies for the source as well as receiver on a per service basis.

A service with multicast IP address is a multicast service. A multicast service will replicate packets to multiple end-point destinations. The destinations can be local to the router or can be peer routers. The following is an example of a multicast service definition in accordance with an exemplary embodiment:

```
Service
   name : mcast,
   id : 10,
   address : 233.252.0.2/32,
   scope : private,
   access-policy : [
      {
         permission : "allow",
         source : "blue"
      }
   ],
   multicast-sender-policy: [
      {
         permission : "allow",
         source : "red"
      }
   ]
```

Here, a multicast service named "mcast" is associated with a multicast address 233.252.0.2. It also has an access policy to allow a tenant named "blue" and a sender policy to allow a tenant named "red." It is important to understand these terms, as they differ from the unicast world.

The access-policy field indicates which receivers are allowed to accept packets from this multicast service. This is different from how unicast services use access-policy. Unicast services use access policies for the originator of the packet (i.e. whether the source has access to this service). However, for multicast services, it is an access-policy for the receivers.

The access-policy ensures that IGMP packets are received only from the receiver tenants allowed on this service. A multicast address indicates a multicast group. The multicast receivers can be can be dynamically learned via IGMP protocol.

In the example above, the access-policy allows receivers that are classified as tenant blue. Here, the router would accept IGMP joins from any interface that has tenant blue configured on it. IGMPv2 membership query messages for the 233.252.0.2 group are sent out of all interfaces that have access to this multicast service. Any interface on the router having a tenant that does not have access to the service will drop all IGMP membership report messages received for that multicast group. Thus, multicast services can impose access controls on the receivers.

The multicast-sender-policy indicates which sources are allowed to send packets to this multicast service. The following shows some exemplary data model changes for the multicast-sender-policy:

```
service foo {
   ...
   list multicast-sender-policy {
      key source;
      description
         "List of multicast sender policies by address
         prefix, QSN or tenant and prefix.";
      uses t128ext:access-policy;
   }
   ...
}
```

Any multicast service needs a source that generates the multicast packet. The sender policy imposes access policies on the sender. In the example above, the sender-policy allows tenant red. This means that the source is allowed to send packets to this multicast group if the source is classified as tenant red.

In an exemplary embodiment, multicast-listeners can be configured on an interface. By default, the receivers (a.k.a. listeners) will be setup based on the tenant-based access-policies that match the interface tenant. However, there may be cases where this needs to be overridden on a per-interface basis. The following is an example configuration definition for configuring multicast listeners in an exemplary embodiment:

```
list network-interface {
   ...
   leaf multicast-listeners {
      type enumeration {
         enum disabled {
            description "Multicast listeners are disabled.";
         }
         enum automatic {
            description
               "Multicast listeners are enabled or disabled
               based on the presence of multicast
   services with tenant based access policies which match this
   interface's tenant.";
         }
         enum enabled {
            description "Multicast listeners are enabled.";
         }
      }
      default automatic;
      description
         "Enables the sending of IGMP and MLD queries
         on this interface.";
   }
   ...
}
```

The multicast-listener configuration can be used to override the current service access-policy. It can be used to enable receivers to join any multicast service using the enabled flag. It also can be used to disable listeners on the interface even if the multicast service allows them via access policies. Since tenants are authority wide in an exemplary embodiment, this would provide more granular control of receivers in case there are outliers within some routers.

In an exemplary embodiment, there are two different deployment use cases for the multicast services, namely Point to Multipoint SVR and Multicast Proxy.

For Point-to-Multipoint SVR, an SVR path refers to secure vector routing between two routers, which, in an exemplary embodiment, is point-to-point for unicast services. But with multicast services, a router will replicate the sourced packet to all other routers that have receivers on them. Hence it is termed point-to-multipoint SVR. In FIG. 21, the datacenter has a multicast server behind an SSR router which will be the source of the multicast service. Each of the branches, branch1 and branch2, have two multicast clients, each of which are the receivers. Consider the same service "mcast" defined in the example above with a multicast address of 233.252.0.2. Each multicast client will send IGMP join messages to the branch routers for the multicast group 233.252.0.2. Hence each branch router will register two receivers for this group. The source packet originating at the data center needs to be sent to both branches.

In a STEP environment, all STEP routers, including any STEP routers in the PIM (Protocol Independent Multicast) cloud, can obtain information on the multicast service and determine which router(s) and path(s) will be used to distribute the source packet. Specifically, each participating router advertises any multicast source(s) and/or multicast receiver(s) associated with the router, and the routers can make routing decisions (such as selecting optimal "rendezvous point" router(s) in the network, e.g., the smallest tree needed to distribute the multicast packets) based on the advertised information. For example, a router associated with one or more multicast receivers (referred to herein as a multicast receiver router) will advertise that it is a multicast receiver router along with information about the multicast receivers. However, multicast services of the type described herein can be supported in a non-STEP environment, for example, by setting up service-routes on the datacenter for each of these branch routers. The following is an example service route configuration for the network configuration shown in FIG. 22:

service-route
   name: branch1 service route
   service: mcast
   peer: branch1
   service-route
   name: branch2 service route
   service: mcast
   peer: branch2

With the above configuration, any packets sent by the multicast server to the multicast group 233.252.0.2 will be forwarded to each branch router via an SVR path. It is important to understand that the SVR paths mentioned here are unicast paths and not multicast. In an exemplary embodiment, the multicast packet from the source will be sent as a unicast packet to each of the branches, using network address translation (NAT) to translate the SVR IP addresses and ports for each path and carrying the original SVR IP addresses and ports in a metadata field in the packet. At the branch, the metadata will be used to find the multicast service and send the packet to all the receivers associated with it. It should be noted that after a branch router has received a unicast packet with metadata, the branch router may establish an association between the translated address/port numbers with the original address/port numbers in the metadata for handling future packets associated with the multicast service, and thereafter the source can stop sending the metadata in subsequent packets to that branch router in order to reduce the overhead incurred by the metadata. It also should be noted that in the above example, the headend (source) router replicates packets to all other routers and there is no multicast tree used for this distribution of packets, and as more branch routers are added, the headend replication can become too inefficient. Therefore, in order to scale more efficiently, exemplary embodiments may have the multicast stream join an existing multicast tree downstream or have replication endpoints that can replicate to other endpoints.

For multicast proxy, the routers can deliver multicast services by joining an existing multicast tree and "proxying" packets between unicast and multicast. For example, with reference again to FIG. 23 having the "mcast" service with address of 233.252.0.2, the datacenter can send the multicast packets into the PIM network in the middle, where the PIM network knows about this multicast group (e.g., in an exemplary embodiment, the PIM network is required to have knowledge of the actual multicast service IP address that is being replicated, and multicast address translation is not supported). This is different from the point-to-multipoint SVR environment discussed above in that the datacenter router transmits multicast packets rather than unicast packets and does not have to replicate the packets for unicast transmission to multiple branches, i.e., only one copy of a source packet needs to be transmitted to the PIM network. Thus, this scheme is more scalable than the point-to-multipoint SVR scheme.

It should be noted that SSRs support encryption for point-to-point SVR paths and therefore encryption can easily be provided in the point-to-multipoint SVR scheme. Providing encryption in the multicast proxy scheme is more complex because there are multiple receivers, although, for example, a common set of encryption keys can be distributed to all receivers so that the source packets can be encrypted once for all receivers.

The branch routers' functionality is the same as that of the point-to-multipoint deployment for interfaces that enable multicast listeners. It receives IGMP reports from interfaces that allow multicast listeners. The main difference here is that the branch routers need to forward these reports to the PIM network. In order to achieve this, the interface can be configured to act as a multicast-report-proxy (e.g., the tenant of the interface which is enabled for PIM proxy should be allowed in the multicast-sender-policy list). This will cause the branch routers to join the PIM network for multicast group 233.252.0.2 and will start receiving packets multicast from the datacenter. These packets in turn will be forwarded to the multicast receivers.

The following is example data model to set up an interface as multicast proxy:

```
list network-interface {
    ...
    leaf multicast-report-proxy {
        type boolean;
        default false;
        description
            "Enables the forwarding of IGMP and
            MLD joins/leaves/reports to valid
        multicast services to this network interface.
        These must come from other network
        interfaces which allow multicast listeners.";
    }
    ...
}
```

Here, when an interface is configured for multicast-report-proxy, it will forward all multicast reports received from any other network interfaces that allow multicast listeners.

In an exemplary embodiment, IGMP joins will be listed in displays of the routing information base, for example, as follows:

Show Rib

Codes: K—kernel route, C—connected, S—static, R—RIP,
   O—OSPF, I—IS-IS, B—BGP, E—EIGRP, N—NHRP,
   T—Table, v—VNC, V—VNC-Direct, A—Babel, D—SHARP,
   F—PBR,
   >—selected route, *—FIB route C>* 169.254.127.126/31 is directly connected, g4294967294, 21:08:01

C>* 172.16.1.0/24 is directly connected, g1, 21:07:43

K>* 224.1.2.3/32 [254/0] is directly connected, g3<==IGMP join received

Multicast Support in Step

In an exemplary embodiment, multicast services work predominantly like any other service except that multicast services are advertised by a router only if multicast (e.g., IGMP) joins are received for the configured multicast address.

FIG. 10 is a schematic diagram showing a topology including a multicast configuration with no receivers. In this example, router R1 is the source. Both router R2 and router R3 are potential receivers. Initially, there are no receivers on router R2 and router R3, and therefore neither router R2 nor router R3 will advertise the multicast service. As a result, router R1 finds no service routes for this service and therefore will not forward packets. The source packets will be dropped at router R1.

STEP helps to discover the multicast receivers for a particular service dynamically. There is no PIM or legacy protocols running in the core. The receivers are simply discovered as part of the multicast services like any other service.

FIG. 11 is a schematic diagram showing the topology of FIG. 10 but now with router R2 having received IGMP joins on two of its interfaces. Router R2 will now advertise the multicast address with two service routes. There are two service routes, as there are two interfaces from which the IGMP joins are received. This is akin to routes being received from another routing protocol or a new service route being configured. Router R2 will stop advertising the service if it receives an IGMP leave from all the receivers. Since R2 will advertise the multicast service, the following is an example STEP document for router R2:

```
{
  node : [ {
    name : "node2",
    peerPaths : [ {
      identifier : "R1+3.5.6.7+node2+12+0",
      hostname : "EastRouter.node2.intf",
      peerName : "peer2",
      vector : [ "mpls" ]
    } ]
    service : [ {
      name : "S1"
      route : [ {
        ipPrefix : "224.1.2.3",
        prefixLength :32,
      } ],
      service-route: [
        {
          name : "mcast-route-intf1",
          serviceNexthop : [
            { vector : "red" },
          ],
```

```
        },
        {
          name : "mcast-route-intf2",
          serviceNexthop : [
            { vector : "blue" },
          ]
        }
      ]
    } ]
  } ]
}
```

Here, router R1 will discover via STEP that the service S1 is available on router R2 and hence it will send all multicast traffic from the source to router R2, which in turn will forward the packets to all the receivers.

Service Exchange Between Districts

STEP routers publish router documents for each district for which they are members. In the event a router is part of more than one district, the routes and services learned from one district will be aggregated and published to the other district with nexthop as self (i.e. a router in one district will not publish all the other peer information it has learned to another district). This way the routers in one district will be hidden from another district. This helps segment the network better as all routers need not learn about all other routers in the network.

FIG. 12 is a schematic diagram showing the same topology as FIG. 6. In this example, there are three districts, specifically a district named "east" including routers DC1, Br1, and Br2; a district named "west" including routers DC2, Br3, and Br4; and a district named "central" including routers DC1 and DC2. Thus, routers DC1 and DC2 are part of two districts.

Consider that service S1 is published by router Br1 in district east and service S2 is published by router Br3 in district west. Branches Br1 and Br2 will not discover service S2 and branches Br3 and BR4 will not discover service S1. However, since routers DC1 and DC2 share the same district "central," the services from district "east" can be learned by Br3 and Br4, and vice versa.

STEP documents published by DC1 in district "central" will have the service S1, but with a local next hop and cost. The cost here is the total cost of vectors to reach the service S1 on branch Br1. A similar operation is done by router DC2 for service S1.

The following are exemplary STEP documents for each of these routers:

Router Br1

Obtains service S1 and service route for S1 via configuration

Publishes service S1 into district east

```
{
  node : [ {
    name : "node2",
    peerPaths : [ {
      identifier : "DC1+3.5.6.7+node2+12+0",
      hostname : "R1.node2.intf",
      peerName : "DC1"
      vector : [ "mpls" ]
    } ]
    service : [ {
      name : "S1"
      route : [ {
        ipPrefix : "1.2.3.0",
        prefixLength : 24
```

```
    } ],
    service-route : [ {
      name : "service-route1",
      serviceNexthop : [
        { vector : "red" },
      ],
    } ]
  } ]
} ]
}
```

Router Br3
    Obtains service S2 and service route for S2 via configuration
    Publishes service S2 into district west

```
{
  node : [ {
    name : "node2",
    peerPaths : [ {
      identifier : "DC2+3.5.6.7+node2+12+0",
      hostname : "R1.node2.intf",
      peerName : "DC2",
      "vector" : [ "mpls" ]
    } ],
    service : [ {
      name : "S2",
      route : [ {
        ipPrefix : "5.5.5.5",
        prefixLength : 32
      } ],
      service-route : [ {
        name : "service-route21",
        serviceNexthop : [
          { vector : "blue" }
        ] }
      } ]
    } ]
  } ]
}
```

Router DC1
    Learns service S2 from DC2 via district "central"
    Publishes the learned service S2 into district "east" with associated cost
    Publishes service S1 into district "central"
    None of the peer topologies are exposed between districts.
    DC1 Document Published Under District East

```
{
  node : [ {
    name : "node2",
    peerPaths : [
      {
        identifier : "Br1+3.5.6.7+node2+12+0",
        hostname : "Br1.node2.intf",
        peerName : "Br1"
        vector : [ "mpls" ]
      },
      {
        identifier : "Br2+3.5.6.7+node2+12+0",
        hostname : "Br2.node2.intf",
        peerName : "Br2",
        vector : [ "mpls" ]
      }
    ],
    service : [ {
      name : "S2",
      route : [ {
        ipPrefix : "5.5.5.5",
        prefixLength : 32,
        nexthop : [ {cost : 20} ]
```

```
      } ]
    } ]
  } ]
}
```

DC1 Document Published Under District Central.

```
{
  node : [ {
    name : "node2",
    peerPaths : [ {
      identifier : "DC2+3.5.6.7+node2+12+0",
      hostname : "DC2.node2.intf",
      peerName : "DC2",
      vector : ["internet"]
    } ],
    service : [ {
      name : "S1",
      route : [ {
        ipPrefix : "1.2.3.0",
        prefixLength : 24,
        nexthop : [ {cost: 10} ]
      } ]
    } ]
  } }
}
```

Router DC3
    Learns service S1 from DC2 via district "central"
    Publishes the learned service S1 into district "west" with associated cost
    Publishes service S2 into district "central"
    None of the peer topologies are exposed between districts
    DC2 Document Published Under District West

```
{
  node : [ {
    name : "node2",
    peerPaths : [
      {
        identifier : "Br3+3.5.6.7+node2+12+0",
        hostname : "Br3.node2.intf",
        peerName : "Br3",
        vector : [ "mpls" ]
      },
      {
        identifier : "Br4+3.5.6.7+node2+12+0",
        hostname : "Br4.node2.intf",
        peerName : "Br4"
        vector : ["mpls"]
      }
    ],
    service : [ {
      name : "S1",
      route : [ {
        ipPrefix : "1.2.3.0",
        prefixLength : 24,
        nexthop : [ {cost : 10} ]
      } ]
    } ]
  } ]
}
```

DC2 Document Published Under District Central.

```
{
  node : [ {
    name : "node2",
    peerPaths : [ {
      identifier : "DC2+3.5.6.7+node2+12+0",
      hostname : "DC2.node2.intf",
```

```
        peerName : "DC2"
        vector : [ "internet" ]
      } ],
      service : [ {
        name : "S2",
        route : [ {
          ipPrefix : "5.5.5.5",
          prefixLength : 32,
          nexthop : [ {cost : 20} ]
        } ]
      } ]
    } ]
}
```

STEP documents for routers Br2 and Br4 are not being provided, as they are not advertising any services.

The above example illustrates how services can be learned and advertised between districts. It is possible that the same service S1 could be learned from district west via DC2. That just means that service S1 is also available in district west. For all routers in district east, it will just show up as another nexthop on DC1.

Figure 18:
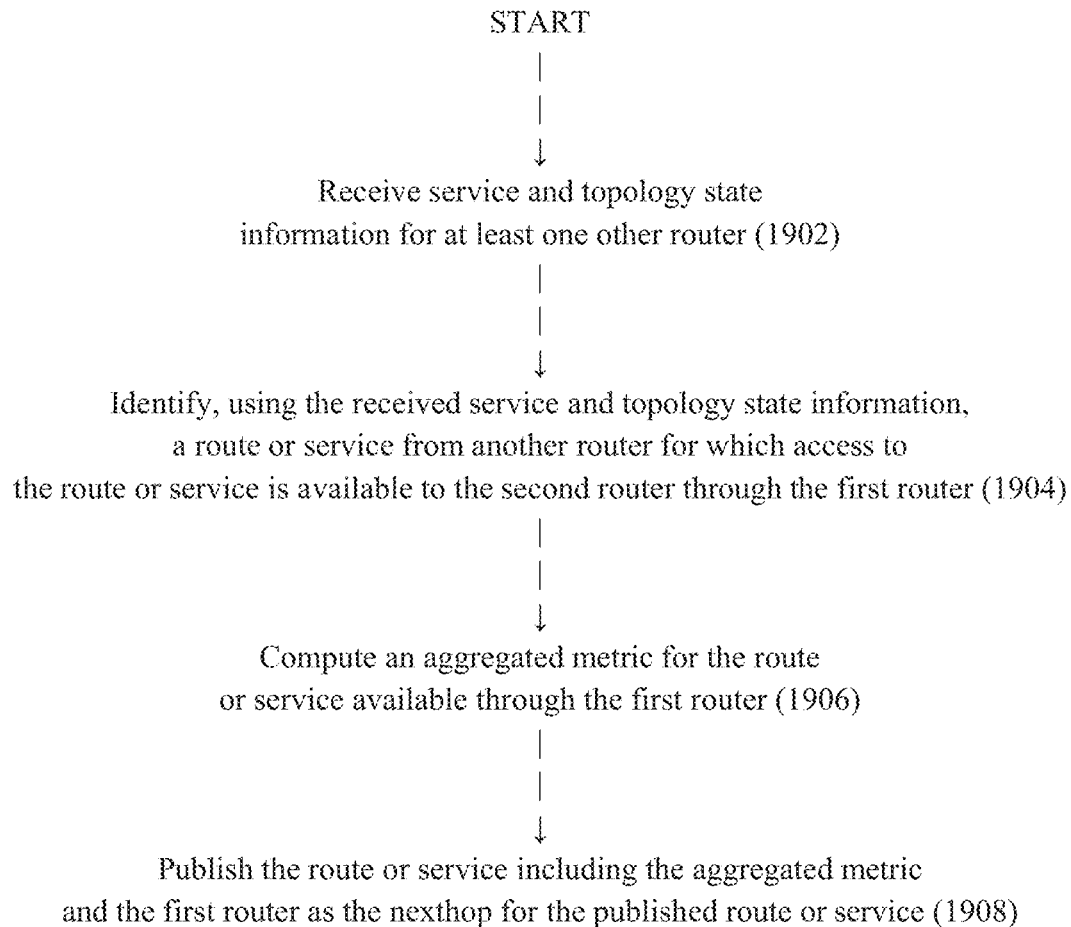
FIG. 18 is a logic flow diagram for publishing an aggregated route or service, in accordance with one exemplary embodiment.

FIG. 18 is a logic flow diagram for publishing an aggregated route or service, in accordance with one exemplary embodiment. In block 1902, a first router receives service and topology state information for at least one other router. In block 1904, the first router identifies, using the received service and topology state information, a route or service from another router for which access to the route or service is available to a second router through the first router. In block 1906, the first router computes an aggregated metric for the route or service available through the first router. In block 1908, the first router publishes the route or service including the aggregated metric and the first router as the nexthop for the published route or service. In certain exemplary embodiments, the first router publishes the route or service by transmitting the route or service to a central repository that is configured to convey the route or service to the second router. As discussed herein the first router may be a member of a first district and a second district, the second router may be a member of the second district, the first router may receive the service and topology state information from at least one other router in the first district, and the first router may publish the route or service to the second router in the second district in a manner that hides, from the second router, information from the first district relating to the route or service.

Loop Prevention with Step

Service exchange between districts could cause one district to relearn what it had advertised into another district and as a result could cause a routing loop. FIG. 13 is a schematic diagram showing a topology including a service exchange between districts that causes a loop. In this example, router R2 hosts a service route SR1 for service S1 and advertises it to router R3. Router R3 in turn advertises it to router R2, which is in district west. Router R3 then advertises it back to router R2. Thus, when router R2 receives the update from router R1, it would think there is another path available for service S1 which is via router R1, while in reality router R2 had received its own advertisement. The same could happen in the direction from router R2 to router R1. In that case, router R2 will receive the update from router R3. This causes a loop in the network.

To prevent loops, the router source path is appended to each route advertised into the other district. The loop prevention algorithm is as follows:

Each router that advertises aggregated routes and services from one district to another will append the district name from where the service/route was aggregated as part of the nexthop. As services are distributed throughout the network, the district paths will get appended to the nexthop.

If a router receives service prefixes/routes with a district in the source path and the router is a member of the district, the router will ignore that prefix/nexthop.

This will ensure that the same service prefixes advertised by one district will not come back to itself via another district.

FIG. 14 is a schematic diagram showing the topology of FIG. 13 but including service exchange between districts with loop avoidance. In this example, router R2 has service route SR1 in district "south" for service S1. The following happens:

R2 advertises S1 in district central, appending district south from where the SR1 was learned. The source path list will have [south]

R3 advertises S1 in district west, appending district central from where SR1 was learned. The source path list will have [south, central]

R1 advertises S1 in district east, appending district west from where SR1 was learned. The source path list will have [south, central, west]

R2 learns the service S1 from district east and finds that district south, which it belongs to, is already in the advertised service route and hence will ignore it. This avoids the loop.

Figure 19:
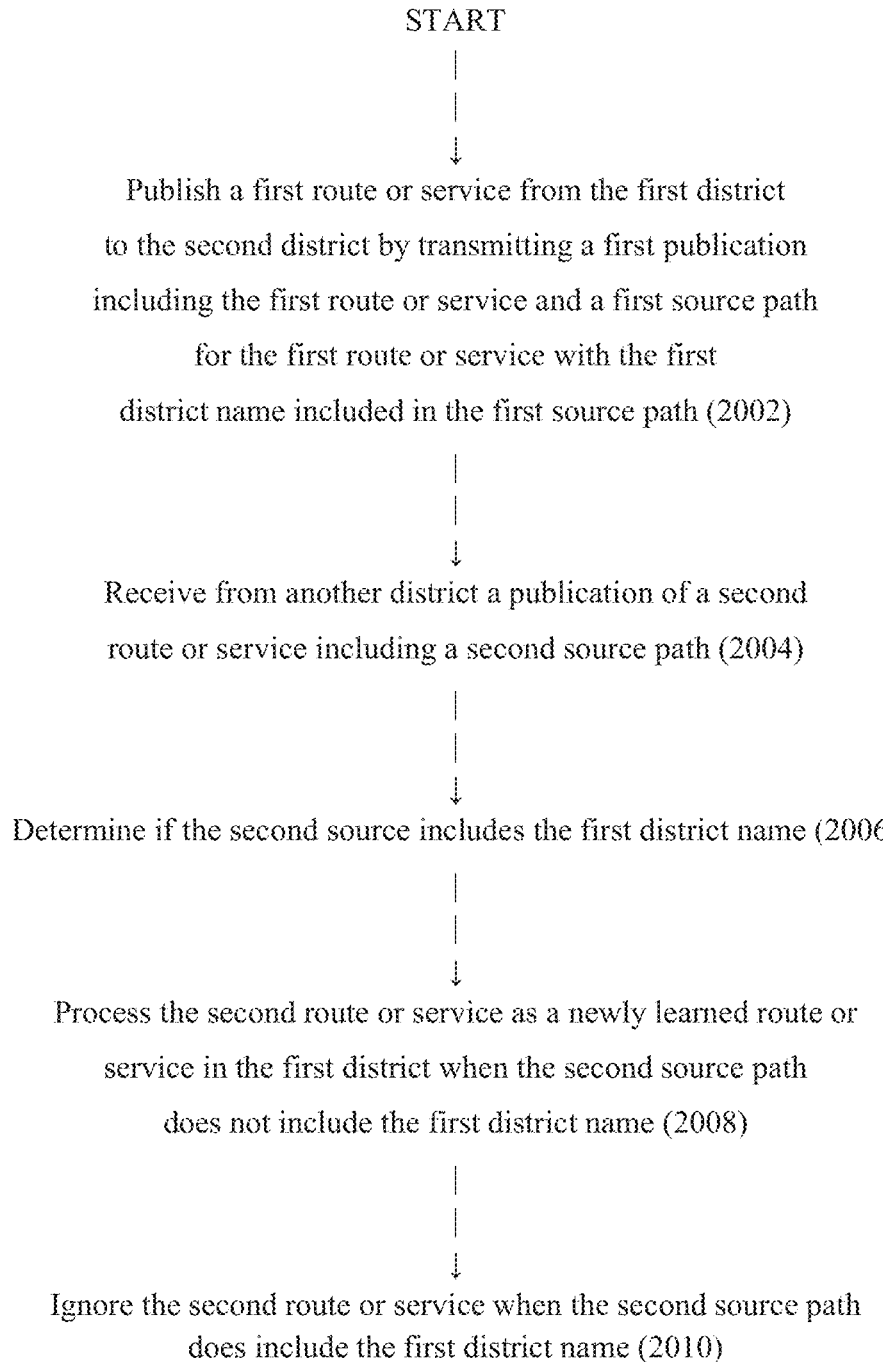
FIG. 19 is a logic flow diagram for loop detection and prevention, in accordance with one exemplary embodiment.

FIG. 19 is a logic flow diagram for loop detection and prevention, in accordance with one exemplary embodiment. In block 2002, a given router in a first district publishes a first route or service from the first district to a second district by transmitting a first publication including the first route or service and a first source path for the first route or service with the first district name included in the first source path. In block 2004, the given router receives from another district a publication of a second route or service including a second source path. In block 2006, the given router determines if the second source includes the first district name. In block 2008, the given router processes the second route or service as a newly learned route or service in the first district when the second source path does not include the first district name. In block 2010, the given router ignores the second route or service when the second source path does include the first district name.

Source-Based Routing with Step

STEP will support the use of source-based routing to route packets in the network. In source-based routing, the source router of a packet or group of related packets (such as for a TCP or other communication session) determines the path to be taken by the packet(s) based on its routing algorithm, taking into account service and topology state information received for one or more other routers via STEP. The source router includes a metadata field in the packet (or, typically, in the first packet of a session), where the metadata field specifies the routers through which the packet(s) are to be carried, e.g., in the form of a router list. Each router along the path (referred to herein as a "waypoint" router) examines the metadata to identify the next intended router on the path and modifies the packet to forward the packet to the next intended router, e.g., by modifying the destination address of the packet to be the address of the next intended router. The waypoint router typically also modifies the source address of the packet to be the address of the waypoint router itself, and may modify other fields of the packet, e.g., source port, destination port, and protocol fields. Original source and destination addressing information for a session also may be carried in the packet as metadata so that each waypoint router can associate the packets with a particular session and so that the final router along the path can revert the source and destination address information in the packet back to the original source and destination address information. These operations are described, for example, in related U.S. patent application Ser. No. 14/833,571, now issued U.S. Pat. No. 9,762,485, which was incorporated by reference above, although it should be noted that with source-based routing, the intermediate waypoint routers are not required to select a next waypoint router but instead obtain the next waypoint router from the metadata in the received packet. As part of this process, the waypoint router can remove itself from the router list in the packet metadata so that only any remaining waypoint routers along the intended path remain in the router list, although this technically is not required (and, in some embodiments, the waypoint router may be excluded from the router list because the waypoint router is implicitly included in the path by virtue of receiving the packet). Each waypoint router typically also establishes forward (and optionally also reverse) association information to associate the session packet(s) with the specified path so that subsequent packets associated with the session, which generally do not include the metadata field, can be identified and forwarded along the specified path. The last waypoint router on the path forwards the packet to its intended destination, typically also removing the metadata field from the packet and reinstating the original source and destination addresses for the packet. Subsequent packets associated with the session traverse the waypoint routers based on the forward (and optionally reverse) association information. Examples of such forward and reverse association information and forwarding of packets based on forward and reverse association information are described in related U.S. patent application Ser. No. 14/833,571, now issued U.S. Pat. No. 9,762,485, which was incorporated by reference above.

Segment routing is very powerful to interact between various heterogeneous networks. STEP goes one step further in providing service level routing separation (i.e., on a per service basis, all paths may not be available to all routers). The service path availability view of one router could be different from that of the advertising router. Therefore, in an exemplary embodiment, is imperative for the router list chosen by the source router to be honored by the other routers.

FIG. 15 is a schematic diagram showing a topology including source-based routing within the same district. In this example, router R1 determines that the path to be traversed for service S1 is via R2 and R4. Router R1 will add R2 and R4 to the router list in its metadata. There is a path to router R4 from router R2 via router R3, but because router R2 inspects the metadata in the packet, it will honor the router list and forward the packet to R4 instead of R3. It should be noted that the router list sent by router R1 could exclude router R2, because router R1 sends the packet to router R2 so including router R2 in the router list could be seen as redundant. Similarly, the router list sent by router R2 could exclude router R4 because router R2 sends the packet to router R4 so including router R4 in the router list could be seen as redundant. Alternatively, assuming a router would never show up in the router list twice, the router list could remain intact as the packet is propagated from router to router, with each router simply examining the router list for itself and then identifying the next router (if any) to receive the packet.

FIG. 15 is a simple example that demonstrates how the source-based routing works in an exemplary embodiment. Without source-based routing, R2 would make an independent routing decision, which could have sent the packet to R3 and R3 possibly could have sent the packet back to R1. Thus, source-based routing can aid in loop prevention.

In an exemplary embodiment, when access to a route or service crosses multiple districts, the router list in the metadata does not cross district boundaries. FIG. 16 is a schematic diagram showing a topology including source-based routing across multiple districts. In this example, router R1 determines that the path to be traversed for service S1 in district east is via router R2. Thus, router R1 sends a packet with a router list (R2) to router R2 in district east. Router R2 pops itself from the metadata, determines a path to router R3 via router R4 within district west, adds a new router list (R4, R3) based on the path it calculates to get to the final destination in district west, and forwards the packet with the new router list to router R4. Router R4 removes itself from the metadata and passes on (R3) in the router list to router R3. Router R3 removes itself from the router-list and, seeing that it is the last router in the list, sends the packet to the final destination. Here, the router list in the metadata does not cross district boundaries. Each router will only route packets among routers within the same district. When packets cross districts, a new router list will be added in order to continue source-based routing if needed.

It should be noted that metadata handling is backward compatible. Any existing routers will ignore the new metadata field and will function as it does today. Any packets received in the new routers with STEP enabled will forward the packet to the next available destination if the packet comes without the router list metadata (e.g. coming from a non-STEP enabled router).

FIG. 20 is a logic flow diagram for source-based routing, in accordance with an exemplary embodiment. In block 2102, the source router determines a path for a route or service including an ordered list of successive routers to receive a packet associated with the route or service starting with a first successive router and ending with a destination router. In block 2104, the source router transmits the packet toward the first successive router with a metadata field including a list of at least one remaining router of the ordered list of routers to receive the packet associated with the route or service. In block 2106, each successive router, starting with the first successive router, determines if the router is the destination router and forwards the packet toward a next successive router in the ordered list of routers if the router is not the destination router. The source router may be configured to include the first successive router in the metadata field or to exclude the first successive router from the metadata field. Each successive router may be configured to remove itself from the metadata field before forwarding the packet to the next successive router. Each successive router may be configured to forward the packet to the next successive packet by changing the destination address of the packet to an address of the next successive router and optionally also to change the source address of the packet to an address of the router. The destination router may be configured to remove the metadata field from the packet and forward the packet to the destination. Alternatively, the destination router may be configured to determine a second path to the destination for the route or service, the second path including a second ordered list of successive routers to receive the packet associated with the route or service, and to transmit the packet a new metadata field including a list of at least one remaining router of the second ordered list of routers to receive the packet associated with the route or service.

It should be noted that source-based routing may be used in one district but not in another district. For example, with reference again to FIG. 16, router R1 could use source-based routing within district east but router R2 could use a different routing scheme within district west (e.g., using traditional routing including STEP-enhanced routing, or using another routing construct such as MPLS), or vice versa.

Network Evaluation with Step

The STEP repository has STEP documents from all STEP routers in the network, advertising their service availability. This means the STEP repository can provide a view of the whole network at any given time and also can provide a history of the changes that happened in the network over a period of time.

In an exemplary embodiment, the user interface (e.g., web client) will be enhanced to provide service level and network level views, relative to the data contained within the STEP repository. Since the STEP repository is non-persistent, a STEP monitoring client on the Conductor will listen to all STEP changes in the network and store them in a persistent time series database. The raw data would be stored and aggregated for configured amount of time. There will also be an interface for viewing the contents of the STEP repository, e.g., to debug routing issues.

The following is an example of a "show" command that lists all STEP repositories and the number of clients connected to each:

| show STEP repos | | | | |
|---|---|---|---|---|
| Location | Address | Uptime | Priority | Clients |
| Router DC1 (primary) | 1.2.3.4 | 12 h | 10 | 100 |
| Conductor | 2.3.4.5 | 10 h | 8 | 20 |
| Router DC2 | 1.3.4.5 | 2 h | 9 | 0 |

Location indicates where these STEP repositories are hosted. The primary repository is where all records are stored. All other repositories proxy requests to the primary. The Clients section indicates the number of clients connected to each repository. On the primary repository, the number of clients preferably includes the proxied requests from the other STEP repositories.

The following is an example of a "summary" command that shows the number of districts and number of routers per district.
show STEP repo summary
Authority: t128
Districts: 2
  Name Routers
  District A 4
  District B 2
Client Connections: 6

Each router repository can be queried independently to see the current state advertised by each router. It shows each district that the router is member of and the advertisement made by the router in each of those districts.
show STEP repo router R1<district>
  District A
  PeerPaths:
    Peer-path-id1
      SLA (updated 2 min ago)
        Latency: 20 ms
        Loss: 0%
        Jitter: 10 ms
      Service Policies
        Policy 1: meets SLA
        Policy 2: does not meet SLA
    Services:
      Service S1
        1.1.1.0/24 nexthop {vector A}
        1.1.1.1/32 nexthop {vector B, sourcePath: DistrictB}
      Service S2
        1.1.1.0/24 nexthop {vector A}
    External Routes:
      Protocols
        BGP
          5.5.5.5/32 nexthop {cost 1, sourcePath: DistrictB}
  District B
  PeerPaths:
    Peer-path-id2
      SLA (updated 3 min ago)
        Latency: 10 ms
        Loss: 1%
        Jitter: 0 ms
      Service Policies
        Policy 1: meets SLA
        Policy 2: meets SLA
  Services:
    Service S1
      1.1.1.1/32 nexthop {vector B}

The previous commands provide the network overview from each router's perspective. While troubleshooting problems in the network, the last changes that happened in the network will be more useful than the whole network view. The following command shows the last changes. The following is an example of showing the last changes.
show STEP repo updates <district> <num last updates>
District A
  1 min ago
  +R1
    Service S1
      1.1.1.0/24 nexthop {vector A}
  -R2
    External Routes
      2.2.2.2/24 nexthop {cost 1}
  2 min ago
  +R3
    peer-path-id1
      Service Policies
        Policy 1: does not meet SLA The user interface (e.g., web client) will be enhanced to show the history of STEP repository changes. The STEP repository has the diff of all network topology changes per district. So, the network topology changes at any point of time can be replayed on the web to show the router changes, path SLA changes, and network outages. This will serve as very powerful tool to monitor network changes and pinpoint outages during a specific period of time.

Figure 17:
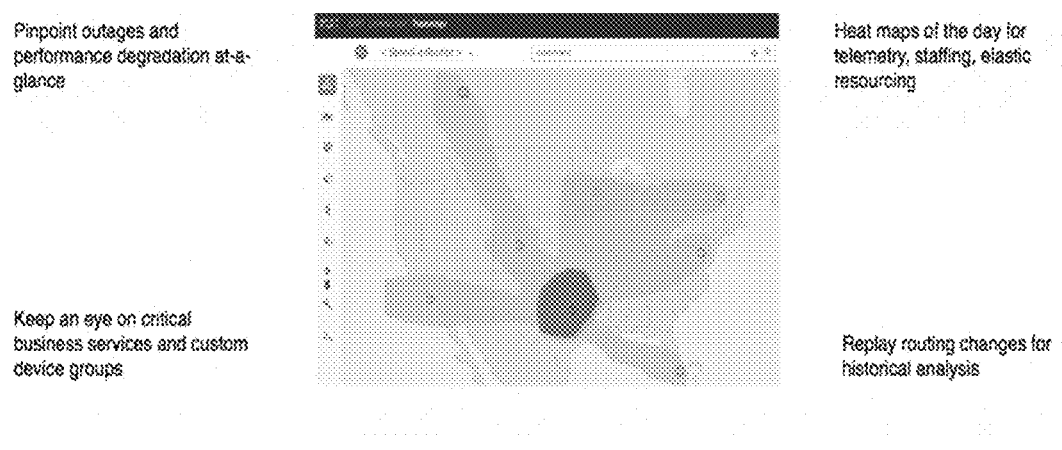
FIG. 17 is a schematic wire frame diagram showing a heatmap view of the network.

FIG. 17 is a schematic wire frame diagram showing a heatmap view of the network.

Aggregated Routes and Services

As discussed above, in the event a router is part of more than one district, the routes or services learned from a first district will be aggregated and published to a second district with the router as the nexthop for the aggregated routes or services (i.e., a router in one district will not publish all the other peer information it has learned to another district). In this way, the routers in the first district will be hidden from the second district, i.e., routers in the second district will know that the route or service is available from the router in the first district that advertised the route or service, but will not have a view into the specific way in which the route or service is provided in the first district. This helps to better segment the network, as the routers in the second district need not learn about all of the routers in the first district.

Furthermore, the router can publish the aggregated route or service with an aggregated path metric, allowing routers in the second district to evaluate the aggregated route or service as an entity without knowing details of the route or service in the first district.

Additionally or alternatively, in order to prevent loops, the router in the first will append the first district name to the source path of the published route or service. Then, if a router in the first district receives a publication of the route or service from another district and the first district name is in the source path of the published route or service, the router will ignore the published route or service.

It should be noted that routers in the second district may receive publications of a particular aggregated route or service from multiple routers in the first district, and each can have a different path metric. Thus, for example, if a particular route or service is available through two routers in a particular district, routers in other districts can select the router having the best metric for the particular route or service.

Alternative Publication Mechanisms

Exemplary STEP embodiments are described above with reference to a publish-subscribe model in which the STEP routers publish STEP documents to the STEP server and subscribe to the STEP server to receive service and topology state information from other routers. However, in alternative embodiments, STEP can be implemented using other mechanisms to selectively distribute service and topology state information among and between routers to accomplish essentially the same functionality as described above.

For one example, the STEP server can be configured to implement a "push" mechanism for selectively transmitting service and topology state information to the routers. Here, for example, rather than the STEP routers subscribing to receive service and topology state information, the STEP router can distribute the service and topology state information received from the STEP routers based on configuration information without the STEP routers subscribing to receive the service and topology state information.

For another example, STEP routers can exchange service and topology state information through a mesh transfer mechanism based on configuration information. Here, for example, each STEP router can be configured exchange service and topology state information with one or more other STEP routers (including in multiple districts), and the STEP routers then can establish peer-to-peer direct or indirect communication connections to exchange the service and topology state information.

For another example, STEP routers can exchange service and topology state information through a peer-to-peer transfer mechanism in which STEP routers pass along service and topology state information to other STEP routers so that all STEP routers obtain the service and topology state information for the other STEP routers from which the service and topology state information is needed. For example, if router A has an adjacency to router B and router B has an adjacency to router C, then router C could transfer its own service and topology state information and optionally other collected service and topology state information to router B, which in turn could transfer its own service and topology state information as well as service and topology state information received from router C to router A.

Thus, STEP generally involves the selective distribution of service and topology state information among and between STEP routers so that the STEP routers can have additional information on which to make routing decisions and can be implemented using a variety of distribution mechanisms.

It also should be noted that many of the applications described above can be supported in non-STEP routing systems through other publication mechanisms. For example, a non-STEP router can advertise an aggregated route or service to an adjacent router, e.g., as part of a link-state exchange.

Miscellaneous

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the STEP server controller and STEP client controller) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

Potential Claims

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) relating to a service and topology exchange protocol includes:

P1. A routing system for implementing a service and topology exchange protocol (STEP), the routing system comprising:
a primary STEP server configured to maintain a STEP repository; and
a plurality of routers, each router including a STEP client in communication with the primary STEP server; wherein:
the STEP client of each router is configured to transmit, using the service and topology exchange protocol, STEP documents containing service and topology state information for at least one route or service available through the router to the primary STEP server for storage in the STEP repository;
the primary STEP server is configured to transmit to the STEP client of each router, using the service and topology exchange protocol, service and topology state information from the STEP repository for at least one other router based on configured relationships between routers; and
each router is configured to make routing decisions based at least in part on the service and topology state information from the at least one other router.

P2. The system of claim P1, wherein the STEP documents include JSON patch documents.

P3. The system of claim P1, wherein the information in the STEP repository is organized as a path tree database and wherein each STEP document includes a path definition identifying the router for storage of the router's service and topology state information in the path tree database.

P4. The system of claim P1, further comprising at least one secondary STEP server that is configured to proxy STEP requests to the primary STEP server.

P5. The system of claim P1, wherein at least one router is a member of a plurality of districts and transmits a separate STEP document containing service and topology state information for each district of which it is a member.

P6. The system of claim P1, wherein at least one router is a member of a plurality of districts and receives service and topology state information for routers in each district of which it is a member.

P7. The system of claim P1, wherein the service and topology state information transmitted by the router further includes a service level agreement for a given service and an indication of whether or not the given service is within the service level agreement.

P8. The system of claim P1, wherein at least one router is a member of a district and transmits service and topology state information including a route or service learned from outside of the district.

P9. The system of claim P1, wherein at least one router transmits service and topology state information including at least one path metric for a route or service.

P10. The system of claim P1, wherein the primary STEP server is separate from the routers.

P11. The system of claim P1, wherein the primary STEP server is in one of the routers.

P12. A server for implementing a service and topology exchange protocol (STEP), the server comprising:
a datastore; and
a service and topology exchange protocol (STEP) server controller in communication with a plurality of routers, the STEP server controller configured to:
maintain a STEP repository in the datastore;
receive, from each of the plurality of routers, using the service and topology exchange protocol, STEP documents containing service and topology state information for storage in the STEP repository; and
transmit, to each router, using the service and topology exchange protocol, service and topology state information from the STEP repository for at least one other router based on configured relationships between routers, the transmitted service and topology state information enabling each router to make routing decisions based at least in part on the service and topology state information from the at least one other router.

P13. The server of claim P12, wherein the STEP documents include JSON patch documents.

P14. The server of claim P12, wherein the information in the STEP repository is organized as a path tree database and wherein each STEP document includes a path definition identifying the router for storage of the router's service and topology state information in the path tree database.

P15. The server of claim P12, wherein at least one router is a member of a plurality of districts and transmits a separate STEP document containing service and topology state information for each district of which it is a member.

P16. The server of claim P12, wherein at least one router is a member of a plurality of districts and receives service and topology state information for routers in each district of which it is a member.

P17. The server of claim P12, wherein the server is separate from the routers.

P18. The server of claim P12, wherein the server is in one of the routers.

P19. A router for implementing a service and topology exchange protocol (STEP), the router comprising:
a datastore;
a service and topology exchange protocol (STEP) client controller in communication with a STEP server, the STEP client controller configured to:
transmit, using the service and topology exchange protocol, service and topology state information for at least one route or service available through the router to the STEP server;
receive, from the STEP server, using the service and topology exchange protocol, service and topology state information for at least one other router based on configured relationships between routers; and
store the received service and topology state information for the at least one other router in the datastore; and a routing engine configured to make routing decisions based at least in part on the service and topology state information for the at least one other router.

P20. The router of claim P19, wherein the STEP documents include JSON patch documents.

P21. The router of claim P19, wherein the information in the STEP repository is organized as a path tree database and wherein each STEP document includes a path definition identifying the router for storage of the router's service and topology state information in the path tree database.

P22. The router of claim P19, wherein the router is a member of a plurality of districts and transmits a separate STEP document containing service and topology state information for each district of which it is a member.

P23. The router of claim P19, wherein the router is a member of a plurality of districts and receives service and topology state information for routers in each district of which it is a member.

P24. The router of claim P19, wherein the service and topology state information transmitted by the router further includes a service level agreement for a given service and an indication of whether or not the given service is within the service level agreement.

P25. The router of claim P19, wherein the router is a member of a district and transmits service and topology state information including a route or service learned from outside of the district.

P26. The router of claim P19, wherein the service and topology state information transmitted by the router includes at least one metric for the route or service.

P27. The router of claim P19, wherein the router further comprises a STEP server configured to maintain a STEP repository.

P28. The system of claim P1, wherein a given STEP document includes only service and topology state information changes.

P29. The system of claim P1, wherein given service and topology state information transmitted by the primary STEP server to the STEP client of a given router includes only service and topology state information changes.

P30. The server of claim P12, wherein a given STEP document includes only service and topology state information changes.

P31. The server of claim P12, wherein given service and topology state information transmitted by the primary STEP server to the STEP client of a given router includes only service and topology state information changes.

P32. The router of claim P19, wherein a given STEP document includes only service and topology state information changes.

P33. The router of claim P19, wherein given service and topology state information transmitted by the primary STEP server to the STEP client of a given router includes only service and topology state information changes.

Without limitation, potential subject matter that may be claimed (prefaced with the letter "P" so as to avoid confusion with the actual claims presented below) relating to metrics on a segment basis includes:

P1. A routing system comprising:
a first router; and
a second router, wherein the first router is configured to receive service and topology state information for at least one other router; identify, using the received service and topology state information, a route or service from another router for which access to the route or service is available to the second router through the first router; compute an aggregated metric for the route or service available through the first router; and publish the route or service to the second router including the aggregated metric and the first router as the nexthop for the published route or service.

P2. The system of claim P1, wherein the first router publishes the route or service by transmitting the route or service to a central repository that is configured to convey the route or service to the second router.

P3. The system of claim P1, wherein:
the first router is a member of a first district and a second district;
the second router is a member of the second district;
the first router receives the service and topology state information from at least one other router in the first district; and
the first router publishes the route or service to the second router in the second district in a manner that hides, from the second router, information from the first district relating to the route or service.

P4. The system of claim P3, wherein the route or service is in the first district.

P5. The system of claim P3, wherein the route or service is in a third district.

P6. The system of claim P3, wherein the first district is associated with a first district name, and wherein the first router is configured to publish the route or service to the second router in the second district including a source path for the published route or service with the first district name included in the source path.

P7. The system of claim P6, wherein the first router is configured to receive the published route or service including the source path from another district and to append the first district name to the source path.

P8. A router comprising:
a datastore; and
a service and topology exchange protocol (STEP) client controller configured to:
receive service and topology state information for at least one other router and store the received service and topology state information in the datastore;

identify, using the received service and topology state information, a route or service from another router for which access to the route or service is available to a second router through the first router;

compute an aggregated metric for the route or service available through the router; and publish the route or service to the second router including the aggregated metric and the router as the nexthop for the published route or service.

P9. The router of claim P8, wherein the STEP client controller is configured to publish the route or service by transmitting the route or service to a central repository that is configured to convey the route or service to the second router.

P10. The router of claim P8, wherein:

the router is a member of a first district and a second district;

the second router is a member of the second district;

the router receives the service and topology state information from at least one other router in the first district; and the router publishes the route or service to the second router in the second district in a manner that hides, from the second router, information from the first district relating to the route or service.

P11. The router of claim P10, wherein the route or service is in the first district.

P12. The router of claim P10, wherein the route or service is in a third district.

P13. The router of claim P10, wherein the first district is associated with a first district name, and wherein the router is configured to publish the route or service to the second router in the second district including a source path for the published route or service with the first district name included in the source path.

P14. The router of claim P13, wherein the router is configured to receive the published route or service including the source path from another district and to append the first district name to the source path.

P15. A routing system for detecting and avoiding loops between a plurality of routers organized into a plurality of districts, the routing system comprising:

a plurality of routers organized into a plurality of districts including at least a first district and a second district, each district associated with a distinct district name, the plurality of routers including a first router that is a member of the first district and the second district, the first router configured to:

publish a first route or service from the first district to the second district by transmitting a first publication including the first route or service and a first source path for the first route or service with the first district name included in the first source path;

receive from another district a second publication of a second route or service including a second source path;

determine if the second source path includes the first district name;

process the second route or service as a newly learned route or service in the first district when the second source path does not include the first district name; and ignore the second route or service when the second source path does include the first district name.

P16. The system of claim P15, wherein the first route or service published by the first router further identifies the first router as a nexthop for the first route or service in the first district.

P17. The system of claim P15, wherein publishing the first route or service from the first district to the second district comprises:

receiving the first publication from another district including the first source path; and appending the first district name to the first source path in the first publication.

P18. The system of claim P15, wherein the first router transmits the first publication to a central repository that is configured to convey the route or service to at least one router in the second district and receives the second publication from the central repository.

P19. A router for detecting and avoiding loops between a plurality of routers organized into a plurality of districts including at least a first district and a second district, each district associated with a distinct district name, the router being a member of the first district and the second district, the router comprising:

a controller configured to:

publish a first route or service from the first district to the second district by transmitting a first publication including the first route or service and a first source path for the first route or service with the first district name included in the first source path;

receive from another district a second publication of a second route or service including a second source path;

determine if the second source path includes the first district name;

process the second route or service as a newly learned route or service in the first district when the second source path does not include the first district name; and ignore the second route or service when the second source path does include the first district name.

P20. The router of claim P19, wherein the first route or service published by the controller further identifies the first router as a nexthop for the first route or service in the first district.

P21. The router of claim P19, wherein publishing the first route or service from the first district to the second district comprises:

receiving the first publication from another district including the first source path; and appending the first district name to the first source path in the first publication.

P22. The router of claim P19, wherein the first router transmits the first publication to a central repository that is configured to convey the route or service to at least one router in the second district and receives the second publication from the central repository.

Without limitation, potential subject matter that may be claimed (prefaced with the letter "P" so as to avoid confusion with the actual claims presented below) relating to distribution of multicast information includes:

P1. A routing system for distributing multicast routing information for a multicast service, the routing system comprising:

a plurality of routers including a multicast source router and a plurality of multicast receiver routers, the plurality of routers providing a multicast service, wherein the routers are configured to exchange multicast information associated with the multicast service including identification of multicast sources and the multicast receivers.

P2. The system of claim P1, wherein each router is configured to transmit, using a service and topology exchange protocol (STEP), the router's multicast information to a STEP repository and to receive from the STEP repository multicast information for the other routers.

P3. The system of claim P2, wherein the central repository is managed by a primary STEP server.

P4. The system of claim P3, wherein the primary STEP server is in one of the routers.

P5. The system of claim P3, wherein the primary STEP server is in a device separate from the routers.

P6. The system of claim P2, wherein the multicast information is transmitted to the STEP server in STEP documents.

P7. The system of claim P6, wherein the STEP documents are JSON documents.

P8. The system of claim P6, wherein the information in the STEP repository is organized as a path tree database and wherein each STEP document includes a path definition identifying the router for storage of the router's multicast information in the path tree database.

P9. The system of claim P1, wherein:

the multicast sources comply with a tenant-based sender access policy that specifies at least one source tenant that is allowed to send packets to the multicast service; and the multicast receivers comply with a tenant-based receiver access policy that specifies at least one receiver tenant that is allowed to receive packets from the multicast service.

P10. The system of claim P1, wherein the routers are configured to determine, based on the exchanged multicast information, an optimal rendezvous point router for distributing the packets associated with the multicast service.

P11. A router for distributing multicast routing information for a multicast service, the router comprising:

a datastore storing multicast information associated with the multicast service including identification of multicast sources and the multicast receivers; and a controller configured to exchange multicast information associated with the multicast service including identification of multicast sources and the multicast receivers.

P12. The system of claim P11, wherein each router is configured to transmit, using a service and topology exchange protocol (STEP), the router's multicast information to a STEP repository and to receive from the STEP repository multicast information for the other routers.

P13. The system of claim P12, wherein the central repository is managed by a primary STEP server.

P14. The system of claim P13, wherein the primary STEP server is in one of the routers.

P15. The system of claim P13, wherein the primary STEP server is in a device separate from the routers.

P16. The system of claim P12, wherein the multicast information is transmitted to the STEP server in STEP documents.

P17. The system of claim P16, wherein the STEP documents are JSON documents.

P18. The system of claim P16, wherein the information in the STEP repository is organized as a path tree database and wherein each STEP document includes a path definition identifying the router for storage of the router's multicast information in the path tree database.

P19. The system of claim P11, wherein:

the multicast sources comply with a tenant-based sender access policy that specifies at least one source tenant that is allowed to send packets to the multicast service; and the multicast receivers comply with a tenant-based receiver access policy that specifies at least one receiver tenant that is allowed to receive packets from the multicast service.

P20. The system of claim P11, wherein the routers are configured to determine, based on the exchanged multicast information, an optimal rendezvous point router for distributing the packets associated with the multicast service.

Without limitation, potential subject matter that may be claimed (prefaced with the letter "P" so as to avoid confusion with the actual claims presented below) relating to multicast source and receiver access control includes:

P1. A routing system for providing multicast access control, the routing system comprising:

a plurality of routers including a multicast source router and a plurality of multicast receiver routers, the plurality of routers providing a multicast service, wherein the routers are configured to enforce multicast access control policies for the multicast service including a receiver access policy that controls which multicast receivers are allowed to receive packets from the multicast service and a sender access policy that controls which multicast sources are allowed to send packets to the multicast service for distribution to the multicast receivers.

P2. The system of claim P1, wherein the sender access policy includes a tenant-based sender access policy that specifies at least one source tenant that is allowed to send packets to the multicast service.

P3. The system of claim P1, wherein the receiver access policy includes a tenant-based receiver access policy that specifies at least one receiver tenant that is allowed to receive packets from the multicast service.

P4. The system of claim P3, wherein the routers accept multicast joins only from interfaces associated with the at least one receiver tenant.

P5. The system of claim P3, wherein the routers accept multicast joins only from interfaces associated with the at least one receiver tenant unless the tenant-based receiver access policy is overridden by configuration on one or more interfaces.

P6. The system of claim P5, wherein at least one router is configured to accept multicast joins from an interface that is not a specified receiver tenant.

P7. The system of claim P5, wherein at least one router is configured to reject multicast joins from an interface that is a specified receiver tenant.

P8. The system of claim P3, wherein the routers are configured to transmit membership query messages on interfaces associated with the at least one receiver tenant.

P9. The system of claim P3, wherein the routers are configured to drop membership report messages on any interface having a tenant that does not have access to the multicast service.

P10. The system of claim P1, wherein the routers are configured to exchange multicast information associated with the multicast service including identification of the multicast sources and the multicast receivers.

P11. The system of claim P10, wherein each router is configured to transmit the router's multicast information to a central repository and to receive from the central repository multicast information for the other routers.

P12. The system of claim P10, wherein at least the source router is configured to determine, based on the exchanged multicast information, an optimal rendezvous point router for distributing the packets associated with the multicast service.

P13. The system of claim P1, wherein the multicast source router is configured to transmit unicast packets for the multicast service to each multicast receiver router associated with at least one multicast receiver.

P14. The system of claim P1, wherein the multicast source router is configured to join a multicast tree and to transmit a multicast packet to multiple multicast receiver routers.

P15. A router for providing multicast access control, the router comprising:
a datastore storing multicast access control policies for a multicast service including a receiver access policy that controls which multicast receivers are allowed to receive packets from the multicast service and a sender access policy that controls which multicast sources are allowed to send packets to the multicast service for distribution to the multicast receivers; and
a controller configured to enforce the multicast access control policies for the multicast service.

P16. The router of claim P15, wherein the sender access policy includes a tenant-based sender access policy that specifies at least one source tenant that is allowed to send packets to the multicast service.

P17. The router of claim P15, wherein the receiver access policy includes a tenant-based receiver access policy that specifies at least one receiver tenant that is allowed to receive packets from the multicast service.

P18. The router of claim P17, wherein the controller is configured to accept multicast joins only from interfaces associated with the at least one receiver tenant.

P19. The router of claim P17, wherein the controller is configured to accept multicast joins only from interfaces associated with the at least one receiver tenant unless the tenant-based receiver access policy is overridden by configuration on one or more interfaces.

P20. The router of claim P19, wherein the controller is configured to accept multicast joins from an interface that is not a specified receiver tenant.

P21. The router of claim P19, wherein the controller is configured to reject multicast joins from an interface that is a specified receiver tenant.

P22. The router of claim P17, wherein the controller is configured to transmit membership query messages on interfaces associated with the at least one receiver tenant.

P23. The router of claim P17, wherein the controller is configured to drop membership report messages on any interface having a tenant that does not have access to the multicast service.

P24. The router of claim P15, wherein the controller is configured to exchange multicast information associated with the multicast service with other routers including identification of any multicast sources and any multicast receivers associated with the router.

P25. The router of claim P24, wherein the controller is configured to transmit the router's multicast information to a central repository and to receive from the central repository multicast information for the other routers.

P26. The router of claim P24, wherein the controller is configured to determine, based on the exchanged multicast information, an optimal rendezvous point router for distributing the packets associated with the multicast service.

P27. The router of claim P15, wherein the controller is configured to transmit unicast packets for the multicast service to each multicast receiver router associated with at least one multicast receiver.

P28. The router of claim P15, wherein the controller is configured to join a multicast tree and to transmit a multicast packet to multiple multicast receiver routers.

Without limitation, potential subject matter that may be claimed (prefaced with the letter "P" so as to avoid confusion with the actual claims presented below) relating to a central authority that distributes service and topology state information changes includes:

P1. A routing system for implementing a service and topology exchange protocol (STEP), the routing system comprising:
a primary STEP server configured to maintain a STEP repository; and
a plurality of routers, each router including a STEP client in communication with the primary STEP server; wherein:
the STEP client of each router is configured to transmit, using the service and topology exchange protocol, service and topology state information for at least one route or service available through the router to the primary STEP server for storage in the STEP repository; and
the primary STEP server is configured to determine, for each router, whether the STEP repository includes any service and topology state information changes for the router based at least in part on the service and topology state information received from the routers and to transmit to the STEP client of each router for which there are service and topology state information changes, using the service and topology exchange protocol, only the service and topology state information changes.

P2. The system of claim P1, wherein the service and topology state information changes transmitted by the primary STEP server include JSON patch documents.

P3. The system of claim P1, wherein the information in the STEP repository is organized as a path tree database and wherein the service and topology state information received from the routers includes a path definition identifying the router for storage of the router's service and topology state information in the path tree database.

P4. The system of claim P1, further comprising at least one secondary STEP server that is configured to proxy STEP requests to the primary STEP server.

P5. The system of claim P1, wherein at least one router is a member of a plurality of districts and transmits separate service and topology state information for each district of which it is a member.

P6. The system of claim P1, wherein at least one router is a member of a plurality of districts and receives from the primary STEP server service and topology state information changes for each district of which it is a member.

P7. The system of claim P1, wherein the service and topology state information transmitted by the router further includes a service level agreement for a given service and an indication of whether or not the given service is within the service level agreement.

P8. The system of claim P1, wherein at least one router is a member of a district and transmits service and topology state information including a route or service learned from outside of the district.

P9. The system of claim P1, wherein at least one router transmits service and topology state information including at least one path metric for a route or service.

P10. The system of claim P1, wherein the primary STEP server is separate from the routers.

P11. The system of claim P1, wherein the primary STEP server is in one of the routers.

P12. A server for implementing a service and topology exchange protocol (STEP), the router comprising:
a datastore; and
a STEP server controller in communication with a plurality of routers, each router including a STEP client, the STEP server controller configured to:
maintain a STEP repository in the datastore;
receive, from the STEP client of each router, using the service and topology exchange protocol, service and topology state information for at least one route or service available through the router;

store the received service and topology state information in the STEP repository;

determine, for each router, whether the STEP repository includes any service and topology state information changes for the router based at least in part on the service and topology state information received from the routers; and transmit to the STEP client of each router for which there are service and topology state information changes, using the service and topology exchange protocol, only the service and topology state information changes.

P13. The server of claim P12, wherein the service and topology state information changes transmitted by the STEP server controller include JSON patch documents.

P14. The server of claim P12, wherein the information in the STEP repository is organized as a path tree database and wherein the service and topology state information received from the routers includes a path definition identifying the router for storage of the router's service and topology state information in the path tree database.

P15. The server of claim P12, wherein at least one router is a member of a plurality of districts and transmits separate service and topology state information for each district of which it is a member.

P16. The server of claim P12, wherein at least one router is a member of a plurality of districts and receives from the STEP server controller service and topology state information changes for each district of which it is a member.

P17. The server of claim P12, wherein the server is separate from the routers.

P18. The server of claim P12, wherein the server is in one of the routers.

Without limitation, potential subject matter that may be claimed (prefaced with the letter "P" so as to avoid confusion with the actual claims presented below) relating to source-based routing across multiple districts includes:

P1. A routing system for routing packets for a route or service, the routing system comprising:

a plurality of routers including a source router, wherein:

the source router is configured to receive, using a service and topology exchange protocol, service and topology state information from a STEP repository for at least one other router based on configured relationships between routers; determine a first path to a destination for a route or service based on the service and topology state information, the first path including an ordered list of successive routers to receive a packet associated with the route or service starting with a first successive router and ending with a destination router; and transmit a packet toward the first successive router with first metadata including a list of at least one remaining router of the ordered list of routers to receive the packet associated with the route or service; and each successive router, starting with the first successive router, is configured to receive a packet and determine if the router is the destination router based on metadata associated with the received packet; and when the router is not the destination router, forward the packet toward a next successive router in the ordered list of routers.

P2. The routing system of claim P1, wherein the source router is configured to include the first successive router in the first metadata.

P3. The routing system of claim P1, wherein the source router is configured to exclude the first successive router from the first metadata.

P4. The routing system of claim P1, wherein each successive router is configured to remove itself from the first metadata before forwarding the packet to the next successive router.

P5. The routing system of claim P1, wherein each successive router is configured to forward the packet to the next successive router by changing the destination address of the packet to an address of the next successive router.

P6. The routing system of claim P5, wherein each successive router is configured to forward the packet to the next successive router by further changing the source address of the packet to an address of the forwarding router.

P7. The routing system of claim P1, wherein the destination router is configured to forward the packet to the destination without metadata.

P8. The routing system of claim P1, wherein the source router is configured to include second metadata in the packet, the second metadata including session identification information.

P9. The routing system of claim P1, wherein the destination router is configured to determine a second path to the destination for the route or service, the second path including a second ordered list of successive routers to receive the packet associated with the route or service, and to transmit the packet with second metadata including a list of at least one remaining router of the second ordered list of routers to receive the packet associated with the route or service.

P10. A router for routing packets for a route or service, the router comprising:

a datastore; and a controller including source router logic configured to:

receive, using a service and topology exchange protocol, service and topology state information from a STEP repository for at least one other router based on configured relationships between routers;

determine a first path to a destination for a route or service based on the service and topology state information, the first path including an ordered list of successive routers to receive a packet associated with the route or service starting with a first successive router and ending with a destination router; and transmit a packet toward the first successive router with first metadata including a list of at least one remaining router of the ordered list of routers to receive the packet associated with the route or service.

P11. The router of claim P10, wherein the source router logic is configured to include the first successive router in the first metadata.

P12. The router of claim P10, wherein the source router logic is configured to exclude the first successive router from the first metadata.

P13. The router of claim P10, wherein the source router logic is configured to include second metadata in the packet, the second metadata including session identification information.

P14. The router of claim P10, wherein the controller further includes successive router logic configured to:

receive a packet and determine if the router is the destination router based on metadata associated with the received packet; and when the router is not the destination router, forward the packet toward a next successive router in the ordered list of routers.

P15. The router of claim P14, wherein the successive router logic is configured to remove itself from the first metadata before forwarding the packet to the next successive router.

P16. The router of claim P14, wherein the successive router logic is configured to forward the packet to the next successive router by changing the destination address of the packet to an address of the next successive router.

P17. The router of claim P16, wherein the successive router logic is configured to forward the packet to the next successive router by further changing the source address of the packet to an address of the forwarding router.

P18. The routing system of claim P14, wherein the successive router logic is configured to forward the packet to the destination without metadata when the router is the destination router.

P19. The routing system of claim P14, wherein the successive router logic is configured to determine a second path to the destination for the route or service, the second path including a second ordered list of successive routers to receive the packet associated with the route or service, and to transmit the packet with second metadata including a list of at least one remaining router of the second ordered list of routers to receive the packet associated with the route or service when the router is the destination router.

CONCLUSION

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A routing system for providing multicast access control, the routing system comprising:
a plurality of routers comprising:
a multicast source router; and
a plurality of multicast receiver routers,
wherein the plurality of routers are configured to provide a multicast service,
wherein the plurality of routers are configured to enforce multicast access control policies for the multicast service, and
wherein the multicast access control policies comprise:
a tenant-based receiver access policy that specifies at least one receiver tenant allowed to receive packets from the multicast service, wherein the plurality of routers are further configured to accept multicast join requests for joining a multicast group for the multicast service only from interfaces of the plurality of multicast receiver routers that are associated with the at least one receiver tenant specified by the tenant-based receiver policy; and
a sender access policy that specifies the multicast source router as allowed to send packets to the multicast service for distribution to the specified at least one receiver tenant.

2. The system of claim 1,
wherein the sender access policy comprises a tenant-based sender access policy that specifies at least one source tenant allowed to send packets to the multicast service,
wherein the plurality of routers are further configured to accept packets sent to the multicast service only from interfaces of the multicast source router that are associated with the at least one source tenant specified by the tenant-based sender policy.

3. The system of claim 1,
wherein the plurality of routers are configured to receive a configuration overriding the tenant-based receiver access policy, and
wherein, in response to receiving the configuration overriding the tenant-based receiver access policy, the plurality of routers are configured to accept a multicast join request for joining the multicast group for the multicast service from an interface of the plurality of multicast receiver routers that is not associated with the at least one receiver tenant specified by the tenant-based receiver policy.

4. The system of claim 1,
wherein the plurality of routers are configured to receive a configuration overriding the tenant-based receiver access policy, and
wherein, in response to receiving the configuration overriding the tenant-based receiver access policy, the plurality of routers are configured to reject a multicast group join request for joining the multicast group for the multicast service from an interface of the plurality of multicast receiver routers that is associated with the at least one receiver tenant specified by the tenant-based receiver policy.

5. The system of claim 1, wherein the plurality of routers are configured to transmit membership query messages on interfaces associated with the at least one receiver tenant specified by the tenant-based receiver policy.

6. The system of claim 1, wherein the plurality of routers are configured to drop membership report messages received from an interface of the plurality of multicast receiver routers that is not associated with the at least one receiver tenant specified by the tenant-based receiver access policy.

7. The system of claim 1, wherein the multicast source router is configured to replicate the packets for the multicast service by transmitting the packets as unicast packets for the multicast service to each multicast receiver router associated with the at least one receiver tenant specified by the tenant-based receiver access policy.

8. The system of claim 1, wherein the multicast source router is configured to:
join a multicast tree for the multicast service; and
transmit a multicast packet as a unicast packet to each multicast receiver router of the plurality of multicast receiver routers.

9. The system of claim 1, wherein each of the at least one receiver tenant and the source tenant comprise a first sub-network and a second sub-network of a plurality of sub-networks, wherein each sub-network of the plurality of sub-networks is segregated and separated from each other sub-network of the plurality of sub-networks.

10. The system of claim 1, wherein each of the at least one receiver tenant and the source tenant comprise a Virtual Local Area Network (VLAN) instance, a Virtual eXtensible LAN (VXLAN) instance, or a Virtual Routing and Forwarding (VRF) instance.

11. A router for providing multicast access control, the router comprising:
a datastore configured to store multicast access control policies for a multicast service comprising:
a tenant-based receiver access policy that specifies at least one receiver tenant allowed to receive packets from the multicast service; and a sender access policy that controls specifies a multicast source router as allowed to send packets to the multicast service for distribution to the specified at least one receiver tenant; and a controller configured to enforce the multicast access control policies for the multicast service by:
  accepting multicast join requests for joining a multicast group for the multicast service only from interfaces of a plurality of multicast receiver routers that are associated with the at least one receiver tenant specified by the tenant-based receiver policy; and
  accepting only packets to the multicast service that are sent by the specified multicast source router.

12. The router of claim 11,
  wherein the sender access policy comprises a tenant-based sender access policy that specifies at least one source tenant allowed to send packets to the multicast service, and
  wherein the controller is further configured to accept packets sent to the multicast service only from interfaces of the multicast source router that are associated with the at least one source tenant specified by the tenant-based sender policy.

13. The router of claim 11, wherein the controller is configured to:
  receive a configuration overriding the tenant-based receiver access policy; and
  in response to receiving the configuration overriding the tenant-based receiver, accept a multicast join request for joining the multicast group for the multicast service from an interface of the plurality of multicast receiver routers that is not associated with the at least one receiver tenant specified by the tenant-based receiver policy.

14. The router of claim 11, wherein the controller is configured to:
  receive a configuration overriding the tenant-based receiver access policy; and
  in response to receiving the configuration overriding the tenant-based receiver access policy, reject a multicast join request for joining the multicast group for the multicast service from an interface of the plurality of multicast receiver routers that is associated with the at least one receiver tenant specified by the tenant-based receiver policy.

15. The router of claim 11, wherein the controller is configured to transmit membership query messages on interfaces associated with the at least one receiver tenant specified by the tenant-based receiver policy.

16. The router of claim 11, wherein the controller is configured to drop membership report messages received from an interface of the plurality of multicast receiver routers that is not associated with the at least one receiver tenant specified by the tenant-based receiver access policy.

17. The router of claim 11, wherein the controller is configured to replicate the packets for the multicast service by transmitting the packets as unicast packets for the multicast service to each multicast receiver router associated with the at least one receiver tenant specified by the tenant-based receiver access policy.

18. The router of claim 11, wherein the controller is configured to:
  join a multicast tree; and
  transmit a multicast packet as a unicast packet to each multicast receiver router of the plurality of multicast receiver routers.

19. A method for providing multicast access control, the method comprising:
  providing, by a plurality of routers, a multicast service, wherein the plurality of routers comprise a multicast source router and a plurality of multicast receiver routers; and
  enforcing, by the plurality of routers, multicast access control policies for the multicast service, wherein the multicast access control policies comprise:
    a tenant-based receiver access policy that specifies at least one receiver tenant allowed to receive packets from the multicast service; and
    a sender access policy that specifies the multicast source router as allowed to send packets to the multicast service for distribution to the specified at least one receiver tenant, and
  accepting, by the plurality of routers and based on the multicast access control policies, multicast join requests for joining a multicast group for the multicast service only from interfaces of the plurality of multicast receiver routers that are associated with the at least one receiver tenant specified by the tenant-based receiver policy.

20. The method of claim 19,
  wherein the sender access policy comprises a tenant-based sender access policy that specifies at least one source tenant allowed to send packets to the multicast service,
  wherein the method further comprises accepting, by the plurality of routers, packets sent to the multicast service only from interfaces of the multicast source router that are associated with the at least one source tenant specified by the tenant-based sender policy.

21. The method of claim 19, further comprising:
  receiving, by the plurality of routers, a configuration overriding the tenant-based receiver access policy; and
  in response to receiving the configuration overriding the tenant-based receiver access policy, accepting, by the plurality of routers, a multicast join request for joining the multicast group for the multicast service from an interface of the plurality of multicast receiver routers that is not associated with the at least one receiver tenant specified by the tenant-based receiver policy.

22. The method of claim 19, further comprising:
  receiving, by the plurality of routers, a configuration overriding the tenant-based receiver access policy; and
  in response to receiving the configuration overriding the tenant-based receiver access policy, rejecting, by the plurality of routers, a multicast join request for joining the multicast group for the multicast service from an interface of the plurality of multicast receiver routers that is associated with the at least one receiver tenant specified by the tenant-based receiver policy.

23. The method of claim 19, further comprising transmitting, by the plurality of routers, membership query messages on interfaces associated with the at least one receiver tenant specified by the tenant-based receiver policy.

24. The method of claim 19, further comprising dropping, by the plurality of routers, membership report messages received from an interface of the plurality of multicast receiver routers that is not associated with the at least one receiver tenant specified by the tenant-based receiver access policy.

25. The method of claim 19, further comprising replicating, by the multicast source router, the packets for the multicast service by transmitting the packets as unicast packets for the multicast service to each multicast receiver router associated with the at least one receiver tenant specified by the tenant-based receiver access policy.

26. The method of claim 19, further comprising:
joining, by the multicast source router, a multicast tree for the multicast service; and
transmitting, by the multicast source router, a multicast packet as a unicast packet to each multicast receiver router of the plurality of multicast receiver routers.

\* \* \* \* \*